US008209872B1

(12) United States Patent
Ende

(10) Patent No.: US 8,209,872 B1
(45) Date of Patent: Jul. 3, 2012

(54) ROLLING PLATE ASSEMBLY ATTACHMENT FOR PORTABLE POWER CUTTING TOOLS INCLUDING AN IMPROVED STRUCTURAL DESIGN AND MANUFACTURED OUT OF IMPROVED MATERIALS, AN IMPROVED WHEEL CONFIGURATION, AND AN ADJUSTABLE BEVEL GEAR AND A CUTTING GUIDE

(75) Inventor: Mathias Am Ende, Los Angeles, CA (US)

(73) Assignee: Woodman Tools, LLC, Torrance, CA (US)

( * ) Notice: Subject to any disclaimer, the term of this patent is extended or adjusted under 35 U.S.C. 154(b) by 250 days.

(21) Appl. No.: 12/799,718

(22) Filed: Apr. 30, 2010

Related U.S. Application Data

(63) Continuation-in-part of application No. 11/801,405, filed on May 9, 2007, now Pat. No. 7,958,641.

(51) Int. Cl.
*B23D 47/02* (2006.01)

(52) U.S. Cl. ........................................... 30/376; 83/395

(58) Field of Classification Search .................... 83/376, 83/395, 485; 30/376, 371, 166.3, 374, 375, 30/379, 377, 379.5, 388
See application file for complete search history.

(56) References Cited

U.S. PATENT DOCUMENTS

| | | | | |
|---|---|---|---|---|
| 1,753,959 | A | | 4/1930 | Wikstrom |
| 1,808,228 | A | | 6/1931 | Hulack |
| 2,676,624 | A | | 4/1954 | Gecmen |
| 2,728,141 | A | | 12/1955 | Green |
| 2,800,933 | A | | 7/1957 | Michael |
| 2,839,098 | A | | 6/1958 | Moretti et al. |
| 3,097,430 | A | | 7/1963 | Lewinski et al. |
| 3,344,824 | A | | 10/1967 | Greco |
| 3,388,728 | A | * | 6/1968 | Riley, Jr. et al. ................ 30/392 |
| 3,839,789 | A | * | 10/1974 | Valkosky ........................ 30/374 |
| 4,087,914 | A | | 5/1978 | Bates |
| 4,275,501 | A | | 6/1981 | Haire |
| 4,414,745 | A | | 11/1983 | Kuhlmann et al. |
| 4,619,170 | A | | 10/1986 | Maier et al. |
| 4,928,662 | A | * | 5/1990 | Chiuminatta et al. ..... 125/13.01 |
| 5,433,008 | A | | 7/1995 | Barger, Jr. |
| 5,815,931 | A | | 10/1998 | Cleveland |
| 5,901,450 | A | | 5/1999 | James |
| 6,202,311 | B1 | | 3/2001 | Nickels, Jr. |
| 6,397,716 | B1 | | 6/2002 | Garuglieri |
| 6,568,088 | B1 | * | 5/2003 | Ende .............................. 30/371 |

(Continued)

FOREIGN PATENT DOCUMENTS

JP 2002370202 12/2002

*Primary Examiner* — Sean Michalski
(74) *Attorney, Agent, or Firm* — Thomas I. Rozsa

(57) ABSTRACT

The present invention is an attachable rolling plate assembly which can be attached as a single unit to a portable cutting tool to facilitate the safe rolling movement of the portable cutting tool on the workpiece. The invention comprises a frame assembly formed from a single piece of molded material such as fiber enriched plastic having a pair of oppositely disposed longitudinal sidewalls with stabilizer fins extending therefrom, and a flat base portion having a pair of parallel stabilizer tubes molded therein. The invention further includes an adjustable bevel gear assembly by which the angle of orientation of the cutting blade can be quickly changed. The invention also includes a cutting guide assembly to facilitate a straight cut, reduce torsional rotation of the saw blade and reduce kickback of the saw.

13 Claims, 28 Drawing Sheets

U.S. PATENT DOCUMENTS

| | | | | |
|---|---|---|---|---|
| 6,757,981 | B2 * | 7/2004 | Hampton | 30/372 |
| 7,159,323 | B2 * | 1/2007 | Petrenko | 30/373 |
| 7,174,641 | B2 | 2/2007 | Kondo et al. | |
| 2002/0066190 | A1 * | 6/2002 | Fey et al. | 30/371 |
| 2003/0070306 | A1 * | 4/2003 | McDonald | 30/371 |
| 2005/0000338 | A1 * | 1/2005 | Wascow | 83/473 |
| 2006/0162171 | A1 * | 7/2006 | Fuchs et al. | 30/374 |

* cited by examiner

ROLLING PLATE ASSEMBLY ATTACHMENT FOR PORTABLE POWER CUTTING TOOLS INCLUDING AN IMPROVED STRUCTURAL DESIGN AND MANUFACTURED OUT OF IMPROVED MATERIALS, AN IMPROVED WHEEL CONFIGURATION, AND AN ADJUSTABLE BEVEL GEAR AND A CUTTING GUIDE

This is a continuation-in-part patent application of patent application Ser. No. 11/801,405 filed on May 9, 2007 now U.S. Pat. No. 7,958,641.

BACKGROUND OF THE INVENTION

1. Field of the Invention

The present invention relates to the field of portable power cutting tools and to an apparatus which facilitates the ease and safety of handling the portable power cutting tool during the operation of the tool.

2. Description of the Prior Art

Portable power circular saws, jig saws, and other power cutting tools are widely used. Most conventional circular saws come with a flat plate attached to the bottom of the circular saw. When the circular saw is in use to cut a workpiece, the bottom plate of the circular saw comes in contact with the workpiece and slides on the workpiece as the circular saw is moving forward along the cutting direction.

The problem with the conventional flat plate device is that during the cutting operation, extra effort is required from the user of the circular saw to overcome the friction between the bottom plate attached to the circular saw and the work-piece. In addition, the standard attachment plates are heavy and have a tendency to slide in a side-to-side motion which often reduces the accuracy of the cut.

In addition, rotatory power cutting tools such as a rotary power saw can create a dangerous situation called kick-back. The heavy weight of the saw causes the saw blade to move out of the linear motion due to an unstable frictional binding of the flat attachment plate against the workpiece. As a result of this veering of the blade off a straight line motion, the blade may bind with the workpiece and subsequently kick back against the worker, thereby possibly causing serious injury to the worker.

The problem has been address by the present inventor in his U.S. Pat. No. 6,568,088 issued on May 27, 2003 for "Wheel Attachment For Portable Power Cutting Tools". While that was a fine invention, it was learned by the present inventor that the invention as embodied in the previous patent has several drawbacks. First, the wheel attachment devices must be individually placed on the saw bracket which is time consuming and results in extra effort. In addition, the wheels are not replaceable and if one wheel is broken or is worn, it may affect the operation of the rotary power saw.

The present inventor created certain improvements in the device as disclosed and claimed in U.S. Pat. No. 6,568,088, which improvements are described and claimed in co-pending patent application Ser. No. 11/413,994 filed on Apr. 28, 2006. The present inventor has now made additional significant improvements to the device as disclosed and claimed in patent application Ser. No. 11/413,994 which substantially increases the ease of operation of the tool and provide significant advantages in the operation of the tool.

The following twenty-seven (27) patents and published patent applications are also relevant to the field of the present invention:

1. U.S. Pat. No. 1,753,959 issued to Alfred Wikstrom on Apr. 8, 1930 for "Guide Wheel For Woodworking Tools" (hereafter the "Wikstrom Patent");

2. U.S. Pat. No. 1,808,228 issued to Eugene Hulack et al. on Jun. 2, 1931 for "Attachment For Electric Drills" (hereafter the "Hulack Patent");

3. U.S. Pat. No. 2,676,624 issued to Arthur C. Gecmen on Apr. 27, 1954 for "Guide Carriage For Power-Driven Hand Tools" (hereafter the "Gecmen Patent");

4. U.S. Pat. No. 2,728,141 issued to Martin Green on Dec. 27, 1955 for "Foot Plate Or Base For Cloth Cutting Machine" (hereafter the "Green Patent");

5. U.S. Pat. No. 2,800,933 issued to Don L. Michael on Jul. 30, 1957 for "Rip Guide For Portable Electric Saws" (hereafter the "Michael Patent");

6. U.S. Pat. No. 2,839,098 issued to Whitfield Moretti et al. on Jun. 17, 1958 for "Cut-Line Indicator For Portable Circular Saw" (hereafter the "Moretti Patent");

7. U.S. Pat. No. 3,097,430 issued to Julius Lewinski et al. on Jul. 16, 1963 for "Cutter" (hereafter the "Lewinski Patent");

8. U.S. Pat. No. 3,344,824 issued to Anthony Greco on Oct. 3, 1967 for "Guide Device For Portable Electric Saws" (hereafter the "Greco Patent");

9. U.S. Pat. No. 3,839,789 issued to John E. Valkosky on Oct. 8, 1974 for "Easy Rolling Circular Saw" (hereafter the "Valkosky Patent");

10. U.S. Pat. No. 4,087,914 issued to Arthur Edward Bates on May 9, 1978 for "Guide Assembly For Portable Saws" (hereafter the "Bates Patent");

11. U.S. Pat. No. 4,275,501 issued to Darrell w. Haire on Jun. 30, 1981 for "Laminate Cutting Assembly" (hereafter the "Haire Patent");

12. U.S. Pat. No. 4,414,745 issued to Gerhard Kuhlman et al. on Nov. 15, 1983 for "Guiding Arrangement For A Hand Tool" (hereafter the "Kuhlman Patent");

13. U.S. Pat. No. 4,619,170 issued to Peter Maier et al. on Oct. 28, 1986 for "Guide For A Hand Power Tool" (hereafter the "Maier Patent");

14. U.S. Pat. No. 4,928,662 issued to Edward Chiuminatta et al. on May 29, 1990 for "Skid Plate For Cutting Unhardened Concrete" (hereafter the "Chiuminatta Patent");

15. U.S. Pat. No. 5,433,008 issued to David L. Barger, Jr. et al. on Jul. 18, 1995 for "Circular Saw With Variable Adjustment Stops" (hereafter the "Barger Patent");

16. U.S. Pat. No. 5,815,931 issued to Todd Cleveland on Oct. 6, 1998 for "Cutting Guide For Controlling The Direction And Cut Of A Hand Held Power Cutting Tool" (hereafter the "Cleveland Patent");

17. U.S. Pat. No. 5,901,450 issued to Thomas Paul James on May 11, 1999 for "Rip Guide For A Circular Saw" (hereafter the "James Patent");

18. U.S. Pat. No. 6,202,311 issued to Richard C. Nickels, Jr. on Mar. 20, 2001 for "Circular Saw With Bevel Angle Adjustment Mechanism" (hereafter the "Nickels Patent");

19. U.S. Pat. No. 6,397,716 issued to Andrea Garuglieri on Jun. 4, 2002 for "Bevel Saw Angle Indicator" (hereafter the "Garuglieri Patent");

20. United States Published Patent Application No. 2002/0066190 issued to Michael Fey et al. on Jun. 6, 2002 for "Guide Means For A Circular Saw" (hereafter the "Fey Published Patent Application"):

21. United States Published Patent Application No. 2003/0070306 issued to Jon Anthony McDonald on Apr. 17, 2003 for "Apparatus For Supporting A Cutting Saw About A Substrate" (hereafter the "McDonald Published Patent Application");

22. U.S. Pat. No. 6,568,088 issued to Mathias Am Ende on May 27, 2003 for "Wheel Attachment For Portable Power Cutting Tools" (hereafter the "Ende Patent");

23. U.S. Pat. No. 6,757,981 issued to Philip W. Hampton on Jul. 6, 2004 for "Universal Rip Guide For Circular Saw" (hereafter the "Hampton Patent");

24. United States Published Patent Application No. 2005/0000338 issued to Joseph Wascow on Jan. 6, 2005 for "Circular Saw Having Bevel And Depth Of Cut Detent System" (hereafter the "Wascow Published Patent Application");

25. U.S. Pat. No. 7,159,323 issued to Alex Petrenko on Jan. 9, 2007 for "Circular Saw For Facilitating Straight Cuts And/Or Cuts At A Desired Angle Relative To A Workpiece Edge" (hereafter the "Petrenko Patent");

26. U.S. Pat. No. 7,714,641 issued to Masaki Kondo et al. on Feb. 13, 2007 for "Cutting Tool" (hereafter the "Kondo Patent");

27. Patent Abstract of Japan No. 2002370202 issued to Kakimoto Kazuhiro on Dec. 24, 2002 for "Circular Saw" (hereafter the "Kazuhiro Patent Abstract of Japan").

The Wikstrom Patent discloses the concept of having a guide wheel 16 which moves ahead of the saw to assist the saw blade 18 in cutting a straight line.

The Hulack Patent discloses an attachment for electric drills including a plurality of rollers 5 which are adapted to have rolling contact with the work piece. It also shows the ability to adjust the angle of the work piece by rotatable member 35 having a channel 38.

The Gecmen Patent discloses a guide for a power driven hand tool. It discloses the concept of having the frame member C which causes the saw to move in a straight line as the guide goes against the side of the work piece as best illustrated in FIG. 1.

The Green Patent is a foot plate or base for a cloth cutting machine. It discloses the concept of having the rolling wheel assembly as best illustrated in FIG. 1. Specifically, the patent states:

> "The material supporting rollers also include a central rearward material supporting roller 39, which is mounted in connection with the rear or heel end portion of the foot plate or base 10 behind the central rearward traction roller 31. In addition to said central rearward material supporting roller 39, it is preferred to also provide idler material supporting rollers 40, which are aligned with said central rearward material supporting roller 39 respectively adjacent opposite ends of the latter. A shaft 41, common to said rearward material supporting rollers 39 and 40, serves to rotatably support said rollers in such disposition that the top peripheries thereof project through an opening 14 of the foot plate or base 10, whereby to intersect the top surface of the latter, thus being operative to engage and support the material moving over said top surface during operation of the cutting machine."

While this patent discloses the concept of the rollers, it is placed in a different way and in a different orientation from the present invention.

The Michael Patent is a rip guide for portable electric saw and discloses the concept of having the transverse member 18 attached with a saw frame so that its vertically orientated portion 38 can be placed against the work piece to assist in guiding the saws to cut in a straight line.

The Moretti Patent discloses a guide member for guiding the straight cut of a saw. Slide 22 is provided with a rip guide being 32 mounted thereon for automatic shifting adjustment as the angle of a blade 5 is changed. Specifically, > "The beam 32 is fitted in a longitudinal channel indicated at 33 and cut in the underside of the slide 22. On its upper surface the beam is suitably marked as at 34 (FIG. 2) to indicate the correct measurements from the line indicator edge 27 to a conventional type of rip guide shoe indicated at 35 (FIG. 3). The rip guide shoe as will be readily appreciated in the art is for guiding the saw along the edge of a workpiece in making a cut.
>
> The beam 32 os adjustably locked on the slide 22 as by means of a clamping knob 36 in which the upper end of a clamping screw 37 extends from a recess adjacent channel 33. In the recess an eccentric foot 38 of the screw is provided to turn against the edge of the beam and releasably bind the same in the position to which it may be adjusted."

The Lewinski Patent embodies the concept of having the rolling members contacting the plate to assist in the cutting guide feature. Specifically, > "A contact plate 20 extends under the base and has openings 21 therein in which transverse rollers 22 are rotatably mounted on axles 23 secured to the upper surface of the plate in such a manner that the rollers project through the openings in the plate and engage the material being cut. This enables the device to be moved over the material being cut easily and without any tendency for the material to move laterally as an incident thereto."

The Greco Patent as best illustrated in FIG. 1 once again discloses a cutting guide member with a transverse section 19 and a vertical section 22 for rolling movement to assist the saw in a cutting mode.

The Valkosky Patent discloses an easy rolling circular saw. It does disclose the concept of having rolling members in the front and back of the plate to assist in the guiding of the saw in a horizontal line. However, the overall structure of this invention is different from the present invention.

The Bates Patent is a guide assembly for portable saws. This includes:

> "A guide for enabling straight-line tracking of handheld portable power saw over a work-piece having a clamp adapted to be secured at the forward edge of the sole plate of the saw, the clamp having at least one roller mounted thereon providing roller support for the saw on the work-piece, the roller having axially spaced apart work-piece engaging sections so as to inhibit angular deviation of the saw as it is moved over the work-piece."

The Haire Patent discloses a laminate cutting assembly. There are wheels 58 but the wheels are on swivels and therefore in addition can orient to cut the tool in various orientations because of the swivel features of the wheels.

The Kuhlman Patent discloses the concept of having a transverse guide 6 and loop shaped projection 18 which can go against the work piece to assist in guiding the cutting saw.

The Maier Patent is a guide for a hand power tool assembly and discloses a foot plate that has a recess thereon which enables it to completely straddle the guide plate while giving lateral guidance. In the recess, there are spring loaded rollers or shoes pressing on the guide plate.

> "As will be seen in FIG. 3, the recess 11 is widened out in steps near the bar members 14 so that the guide plate 4 bridges over the recess 11 like a gantry or portal. In the wider part of the recess 11 there are spring loaded wheel members 19 or sliding shoes 20, that run on the topside of the guide plate 7 and give the desired loading pressure. The use of wheel members or sliding shoes means that the foot plate 4 is able to run on the guide plate 7 with little friction."

Therefore, this invention does disclose the concept of having the spring loaded rollers in the guide plate.

The Chiuminatta Patent is a skid plate for a concrete cutting saw which discloses the concept of rollers to assist in rolling the saw along the concrete. It also discloses:

"The pivot block 60 is spaced apart from the base plate 12 by a boss 62 so that the pivot block 60 is above the surface of the base plate 12. On the boss 62 is mounted a selector bracket 64 which comprises a piece of metal roughly resembling a sector gear in shape. The selector bracket 64 has a narrow edge extending in the direction of the extendable handle 58. Into this edge are cut recesses or notches 66. These notches 66 are shaped and located so that the can mate with a tip 68 of a plunger 70 of a solenoid 72. The solenoid 72 is mounted on, and is substantially parallel to, the extendable handle 58."

Therefore, this patent does disclose the concept of the orienting pivot block.

The Barger Patent discloses a circular saw which includes a means to adjust the orientation of the saw through the variable adjustment stops. Specifically, the patent states:

"In the preferred embodiment, the adjustment means includes a base member with an elongated arcuate opening. First and second stops are positioned at opposite ends of the opening. A first stop engagement member is attached to the housing of the saw and is received within the elongated arcuate opening of the base member. A second stop engagement member is selectively mounted on the first engagement member in a first position and a second position. In the first position, the first engagement member engages the first and second stops to define the limits of the planar position of the blade and in its second position, the second engagement member engages the first and second stops to define the limits of the planar positioning of the blade."

The Cleveland Patent discloses a cutting guide for the purpose of assisting the guiding of the saw as it cuts the workpiece. Specifically, the patent states:

"Guide arms 25 and 26 (of FIG. 1) are each formed from an elongated metal rod. Each arm 25 and 26 has a leading end portion 33, a follower portion 35, and an elbow portion 34 located between the leading end and follower portions 33 and 35. The leading end portion 33 of each guide arm 25 and 26 is sufficiently long so that the follower portion 35 can reach an edge of the workpiece. Each elbow portion 34 has a pair of bends to position the follower portion 35 about ½ inch below and in perpendicular alignment with the leading end portion 33. Thus, when the leading end portion 33 of guide arm 25 is inserted through the apertures of guide ears 27 and 29, it may be lockably positioned to allow the follower portion 35 to be selectively distanced from the saw blade 5 so as to be able to engage and ride along a side of the workpiece, thereby controlling the cutting path of the power saw 1 in a direction parallel to the side of the workpiece that is engaged by the follower portion 35 of the guide arm 25."

The James Patent discloses another configuration for a rip guide for a circular saw. It discloses:

"The guide member 108 also includes a second guide surface 124 spaced from and facing opposite to the first guide surface 112. The guide member 108 also includes a second rear surface 128. The second guide surface 124 and the second rear surface 128 define a second guide surface edge 132 therebetween.

When the rip guide 10 is supported by the shoe plate 40, the first and second guide surfaces 112 and 124 are generally parallel to the lateral side portions 64 and 68 of the shoe plate 40. Also, when the shoe plate 40 is orientated in the non-beveled, horizontal position perpendicular to the vertical saw blade 22, the first and second guide surfaces 112 and 124 are generally parallel to a vertical plane defined by the saw blade 22.

The guide member 108 also includes connecting member 136 between the first guide surface 112 and the second guide surface 124. As best shown in FIG. 3, the guide member 108 is substantially U-shaped. The connecting member 136 is connected at one end to the first guide surface 112 and defines a first smooth, curved or arcuate edge 140 therebetween. At the other end, the connecting member 136 is connected to a second guide surface 124 and defines a second smooth, curved or arcuate edge 144 therebetween."

The Nickels Patent is a circular saw with bevel angle adjustment member. The bevel angle adjustment mechanism pivotally interconnects the base to the housing such that the circular saw blade is adjustable relative to the base through a range of beveled angles. Therefore, this patent also discloses the concept of orienting the blades at different angles by the mechanism as shown in the front portion of the saw.

The Garuglieri Patent also discloses a beveled angle adjustment mechanism to adjust the angle and cut of the saw blade. It discloses:

"A bevel angle indicator for a saw is disclosed. The saw 10 consists of a table 16, a pivot support 26 pivotally mounted with respect to the table 16 about a bevel axis 92 and a mechanical saw blade pivotally mounted with respect to the pivot support 26 about a second axis 28. The pivot support 26 pivots on a pivot block 27 attached to the table 16. A gearing mechanism couples the pivot block 27 and the pivot support 26 to a dial which indicates the angle between the surface of the table 16 and the plane of the saw blade. The gearing mechanism comprises a rack 50 attached to the pivot block 27 and a pinion 54 rotatably journaled in the pivot support 26. Adjustment of the bevel angle of the saw 10 causes the pinion 54 to advance along the rack 50 and therefore rotate relative to the pivot support 26. The pinion 54 is attached to a sleeve 52, the free end of which carries a pointer 56; the pivot support 26 carries a scale 58. The pointer 56 and scale 58 indicate with accuracy the current bevel angle of the saw."

The Fey Published Patent Application for a guide means for a circular saw was published in 2002. It discloses a pair of wheels on the front and back of the plate to assist the saw in its movement. As set forth in Section 24, the patent states:

"The surface region 15 of the one-piece, cylindrical guide roller 12 is in contact with the surface 3 of the workpiece 4, thereby forming a contact region. The contact region extends over the entire length 1 of the guide roller 12. The surface region 15 has an anti-slip coating 16 made of an elastic material, such as rubber. This avoids an uncontrolled sliding of the hand-held power tool on the surface 3. The guide roller 12 extends crosswise to the working direction A over the entire width of baseplate 2."

The McDonald Published Patent Application again discloses the concept of having the roller assembly to assist a saw and the guide adjustment pivot mechanism 17 to adjust the angle of the saw.

The Hampton Patent is a rip guide for a circular cutting saw. It discloses a guide member which goes against the face 53 which is placed against the face of the workpiece to assist in the straight cutting of the saw.

The Wascow Published Patent Application was published in 2005 and discloses a device to assist in the angle and depth of the saw blade cut. The assembly has a bunch of notches 72 on its outer surface with a mating mechanism enabling it to lock in place through the ratchet teeth 101 as the item is adjusted by the adjusting mechanisms 96 and 99 to enable the angle of the saw to be cut at different angles.

The Petrenko Patent is a guide plate for a circular cutting saw that has a multiplicity of wheels on the bottom and in fact sites your above-discussed patent. It does disclose the concept of having straight line wheels and a multiplicity of wheels in different locations on the guide plate.

The Kondo Patent is a cutting tool which was assigned to Makita Corporation and issued in February 2007. As described in the abstract:

> "The present invention provides a technique for improving the workability of a cutting tool. According to the present invention, a cutting tool may comprise a body, a base, a sub-base and a parallel ruler. The body may have a blade that can be rotationally driven. The base may be connected to the body, while the base is placed in contact with the upper surface of the workpiece. The body may tilt in a pivotal movement about an axis substantially parallel to the cutting direction such that a cutting operation can be performed with the blade projecting laterally outward from a side of the base. The sub-base may be removably attached to the base on the side from which the blade projects. The parallel ruler may be removably attached to the base on the side on which the sub-base is attached or on the opposite side of the base, together with the sub-base or in the state in which the sub-base is not attached."

Finally, the Japanese Published Application English abstract reads:

> "A plurality of guide rollers 12*a* and 12*b* are provided to a side edge 8*a* along a longitudinal direction of the base 8 of the circular saw. Since the guide rollers 12*a* and 12*b* guide the floor plate by abutting against the wall when the floor plate and the like are cut with the circular saw, the wall is not stained with the impulse marks."

Therefore, there is a significant need for an improved device to assist in the safe operation of a rotary cutting tool and which overcomes the deficiencies in the present inventor's previous inventions.

SUMMARY OF THE PRESENT INVENTION

The present invention is an attachable rolling plate assembly which can be attached as a single unit to a portable cutting tool to facilitate the safe rolling movement of the portable cutting tool on the workpiece. The invention comprises a frame assembly formed from a single piece of injection molded fiber enriched plastic which facilitates strong weight and torsional stress memory and which includes a front wheel housing portion, a back wheel housing portion, and an improved structural plate design having an increased horizontal surface and stabilizer tubes and stabilizer fins. The wheel housings each removably retain a wheel located at the leading transverse edge of the housing. The invention includes the pair of spaced apart wheels and means to retain a cutting tool on the housings so that the cutting tool can be rolled on the workpiece during operation of the tool while the cutting blade portion of the tool extends through an opening in the horizontal plate. The invention further includes an adjustable bevel gear assembly by which the angle of orientation of the cutting blade can be quickly changed. The invention also includes a cutting guide assembly to facilitate a straight cut, reduce torsional rotation of the saw blade and reduce kickback of the saw.

It has been discovered, according to the present invention, that if an attachment member used with a rotary power cutting tool is comprised of a structure which is made out of injection molded fiber enriched plastic which includes an increased flat plate surface area and stabilizer fins, then the weight of the attachment member is significantly reduced while the structural integrity and strength is significantly increased, to facilitate ease of operation during the cutting process.

It has further been discovered, according to the present invention, that if the attachment member used with a rotary power cutting tool has a base plate which is made out of injection molded fiber enriched plastic which includes an increased flat plate surface area and stabilizer fins, and is comprised of a single formed part having a front and rear housing, and if each housing removably retains a single rolling wheel which extends outwardly from the leading edge of the housing, then a portable power tool can be retained on the attachment member which becomes a rolling plate assembly which facilitates a rolling motion of the power tool as it is used to operate on a workpiece. The improvement of having one long wheel which extends for almost the entire length of a housing member significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It has also been discovered, according to the present invention, that if the rollable wheels on the rolling plate assembly are made of material such as polyurethane or rubber which creates a traction on a workpiece as the part is rolling during a cutting operation, then the traction of the wheels prevent a side to side lateral movement of the power cutting tool such as rotary cutting saw to thereby reduce the possibility that the cutting blade will be caused to move out of alignment and thereby bind to the workpiece during cutting, thereby significantly reducing the possibility of a kick-back of the cutting rotary saw against the worker operating the power tool.

It has further been discovered, according to the present invention, that if wheels are removably retained within each housing member, then if one or more wheels becomes damaged or is badly worn, the damaged or worn wheel can be easily replaced and it is not necessary to discard the entire rolling plate assembly.

It has also been discovered, according to the present invention, that if the wheels of the rolling plate assembly have a diameter which raises the body of the rolling plate assembly above the workpiece, the ease of rolling is facilitated. In addition. the wheels help to absorb vibration from the power tool.

It has also been discovered, according to the present invention, that if the front wheel of the rolling plate assembly further includes a cutting line, it will provide an improved indicator means to facilitate cutting a straight line with the power tool.

It has further been discovered, according to the present invention, that if the rolling plate assembly has means to quickly attach a power tool such as a rotary cutting saw to the assembly, then the assembly can be quickly attached thereby saving time and effort during the cutting process. One housing member can retain an attachment means which is attached to the front of a rotary power saw by a pair of mating arms through which an attaching bolt is connected. The member can have an arcuate tilt bracket with the connecting arms attached by a rotatable rivet so that the angle of tilt of the rotary power saw relative to the rolling plate assembly can be adjusted to a desired angle of tilt. If the oppositely disposed housing member supports an attachment means which includes an elevation bracket with an arcuate opening and which is rotatably supported so that it can be rotated in a vertical direction, the angle of arc of the cutting blade of a rotary power saw and the depth of the blade relative to the bottom of the rolling plate assembly can be vertically adjusted to achieve any desired depth of cut. If this assembly is also rotatably attached to the second housing member, then the angle of tilt of the back of the rotary power saw can also be adjusted to any desired angle of tilt.

It has further been discovered, according to the present invention, that if the attachment means by which the power tool is attached adjacent to the front of the rolling plate assembly further comprises an arcuate calibrated bevel bracket having a multiplicity of teeth along its top edge which intermesh with mating teeth on a flexible adjustment lever, then the angle of orientation of the bevel bracket can be quickly reset by moving the flexible adjustment lever to a position wherein its teeth disengage from the teeth of the calibrated bevel bracket so that it can be rotated to a desired angle relative to the vertical and thereafter the flexible adjustment lever is released so that its teeth intermesh with the teeth of the arcuate calibrated bevel bracket at the new position. As a result, the angle of the power tool attached to the calibrated bevel bracket can be very quickly reset. If the power tool is a circular saw, then the angle of the cutting blade can be very quickly reset.

It has additionally been discovered, according to the present invention, that if the frame assembly has means to retain a cutting guide which comprises an elongated frame by which the cutting guide is affixed to the frame assembly and which further comprises a housing rotatably supporting a pair of spaced apart transverse wheels, then the wheels can be placed against the vertical surface of the workpiece and roll with the rolling plate assembly as the power tool is operated to facilitate the power tool moving in a straight line. As a result, the cutting guide facilitates a straight line motion of the power tool such as a circular power saw, reduces torsional rotation of the power tool, and reduces kickback of the power tool.

Therefore the key innovative features of the present invention are: (1) a rollable plate assembly having a removable wheel which can be quickly replaced and having the wheel extend out of the leading edge of its retaining housing to enable the power tool be to be lifted off the surface of the workpiece and to facilitate a smooth rolling motion of the power tool on the workpiece; (2) a rapid adjustable calibrated assembly which retains the leading edge of the power tool and by which the angle of orientation of the power tool can be rapidly adjusted; (3) a guide mechanism which is affixed to the rolling plate assembly and has a rolling motion along the vertical surface of the workpiece in which the horizontal surface is being cut or otherwise operated on, to thereby facilitate a straight line motion of the power tool and reduce torsional rotation and kickback of the power tool; and (4) the base of the rolling plate assembly is made out of a single piece of injection molded fiber enriched plastic which includes stabilizer tubes and stabilizer fins, so that the torsional strength of the base plate is significantly improved. One example of the fiber enriched plastic is fiber enriched polyurethane—Celstran TPU—GF 40 or Celstran TPU—GF 50 sold under the name ISOPLAST.

It is therefore an object of the present invention to provide an attachment member which is used with a rotary power cutting tool and is comprised of a base plate made out of a single piece of injection molded fiber enriched plastic with stabilizer tubes and raised fins, so that the weight of the attachment member is significantly reduced and the torsional strength of the structural member is significantly increased, to thereby facilitate ease of operation during the cutting process.

It is a further object of the present invention to provide an attachment member to be used with a rotary power cutting tool which is comprised of a base plate which is made out of injection molded fiber enriched plastic which includes an increased flat plate surface area and stabilizer fins and is further comprised of a single formed part having a front and rear housing, wherein each housing removably retains a single rolling wheel which extends outwardly from the leading edge of the housing, so that a portable power tool can be retained on the attachment member which becomes a rolling plate assembly which facilitates a rolling motion of the power tool as it is used to operate on a workpiece. The improvement of having one long wheel which extends for almost the entire length of a housing member significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It is also an object of the present invention to include rollable wheels on the rolling plate assembly which are made of material such as polyurethane or rubber which creates a traction on a workpiece as the part is rolling during a cutting operation, so that the traction of the wheels prevent a side to side lateral movement of the power cutting tool such as a rotary cutting saw to thereby reduce the possibility that the cutting blade will be caused to move out of alignment and thereby bind to the workpiece during cutting, thereby significantly reducing the possibility of a kick-back of the cutting rotary saw against the worker operating the power tool.

It is a further object of the present invention to have the wheels removably retained within each housing member, so that if one or more wheels becomes damaged or is badly worn, the damaged or worn wheel can be easily replaced and it is not necessary to discard the entire rolling plate assembly.

It is also an object of the present invention to provide wheels of the rolling plate assembly which have a diameter which raises the body of the rolling plate assembly above the workpiece, so that the ease of rolling is facilitated. In addition. the wheels help to absorb vibration from the power tool.

It has also an object of the present invention to provide the front wheel of the rolling plate assembly with a cutting line to thereby provide an improved indicator means to facilitate cutting a straight line with the power tool.

It is a further object of the present invention to provide a rolling plate assembly having means to quickly attach a power tool such as a rotary cutting saw to the assembly, so that the assembly can be quickly attached thereby saving time and effort during the cutting process. One housing member can retain an attachment means which is attached to the front of a rotary power saw by a pair of mating arms through which an attaching bolt is connected. The member can have an arcuate tilt bracket with the connecting arms attached by a rotatable rivet so that the angle of tilt of the rotary power saw relative to the rolling plate assembly can be adjusted to a desired angle of tilt. If the oppositely disposed housing member supports an attachment means which includes an elevation bracket or plunge bracket with an arcuate opening and which is rotatably supported so that it can be rotated in a vertical direction, the angle of arc of the cutting blade of a rotary power saw and the depth of the blade relative to the bottom of the rolling plate assembly can be vertically adjusted to achieve any desired depth of cut. If this assembly is also rotatably attached to the second housing member, then the angle of tilt of the back of the rotary power saw can also be adjusted to any desired angle of tilt.

It is a further object of the present invention to provide an attachment means by which the power tool is attached adjacent to the front of the rolling plate assembly which further comprises an arcuate calibrated bevel bracket having a multiplicity of teeth along its top edge which intermesh with mating teeth on a flexible adjustment lever, so that the angle of orientation of the bevel bracket can be quickly reset by moving the flexible adjustment lever to a position wherein its teeth disengage from the teeth of the calibrated bevel bracket so that it can be rotated to a desired angle relative to the vertical and thereafter the flexible adjustment lever is released so that its teeth intermesh with the teeth of the arcuate calibrated bevel bracket at the new position. As a result, the angle of the power tool attached to the calibrated bevel bracket can be very quickly reset. If the power tool is a circular saw, then the angle of the cutting blade can be very quickly reset.

It is an additional object of the present invention to provide a frame assembly which has means to retain a cutting guide which comprises an elongated frame by which the cutting guide is affixed to the frame assembly and which further comprises a housing rotatably supporting a pair of spaced apart transverse wheels, so that the wheels can be placed against the vertical surface of the workpiece and roll with the rolling plate assembly as the power tool is operated to facilitate the power tool moving in a straight line. As a result, the cutting guide facilitates a straight line motion of the power tool such as a circular power saw, reduces torsional rotation of the power tool, and reduces kickback of the power tool.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
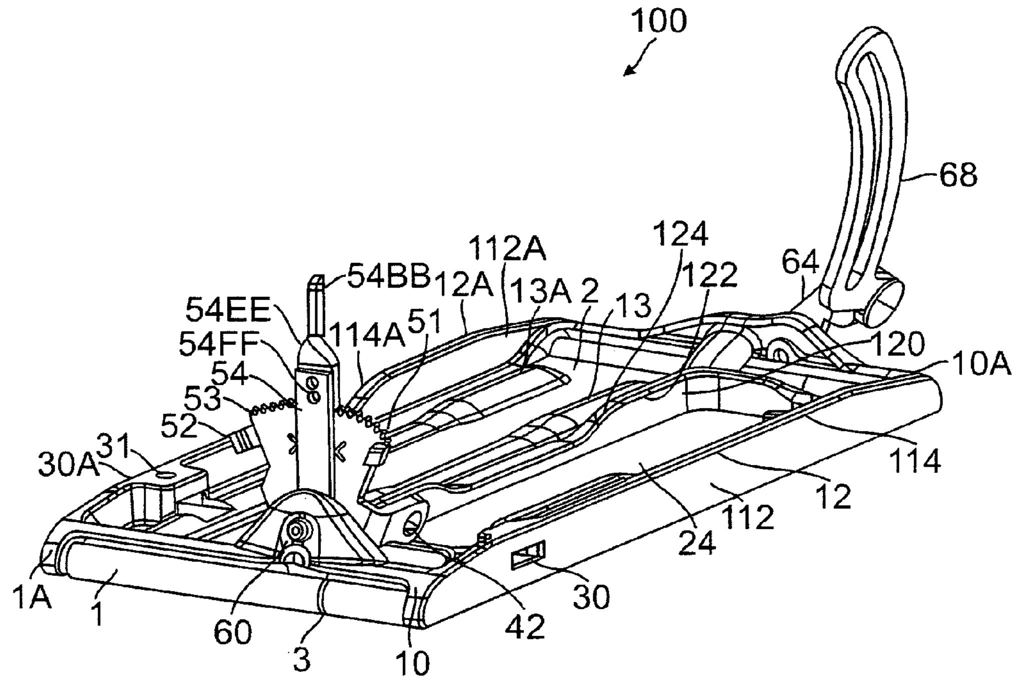
FIG. 1 is a front perspective view of the fully assembled rolling plate assembly of the present invention.
Figure 2:
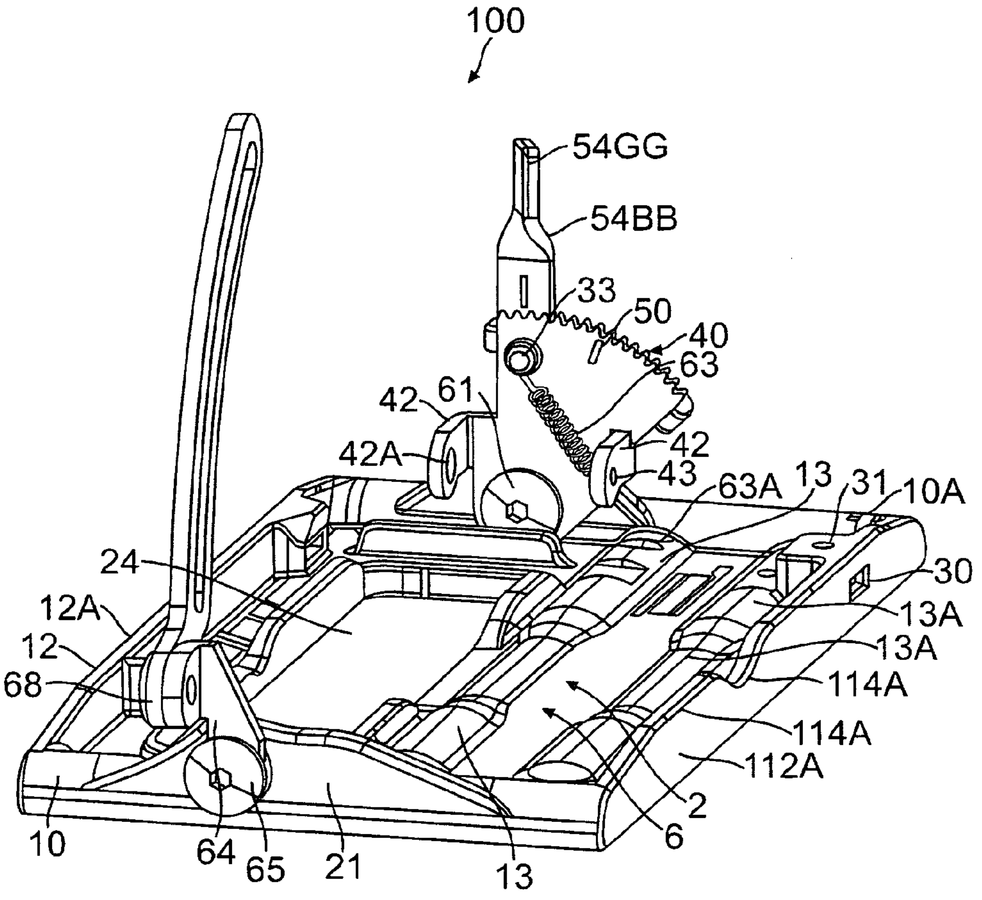
FIG. 2 is a rear perspective view of the fully assembled rolling plate assembly of the present invention.
Figure 3:
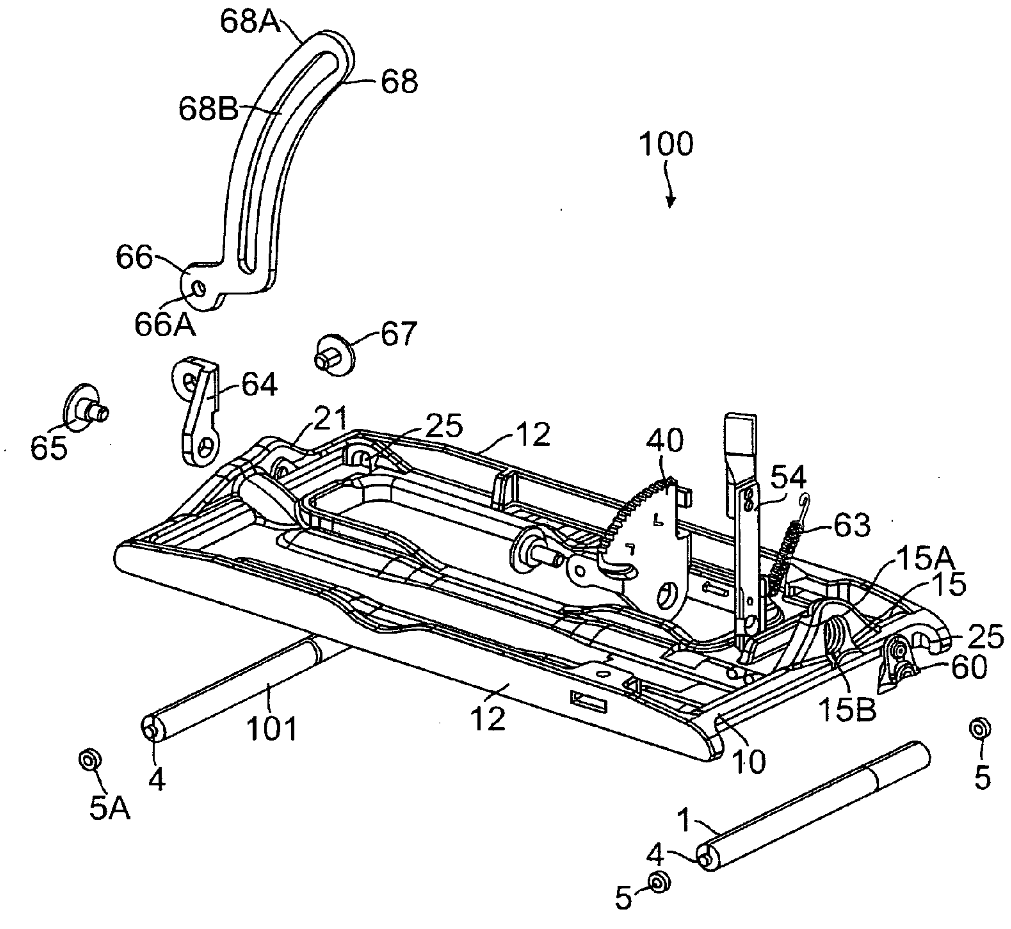
FIG. 3 is a front perspective exploded view illustrating components of the present invention rolling plate assembly.
Figure 4:
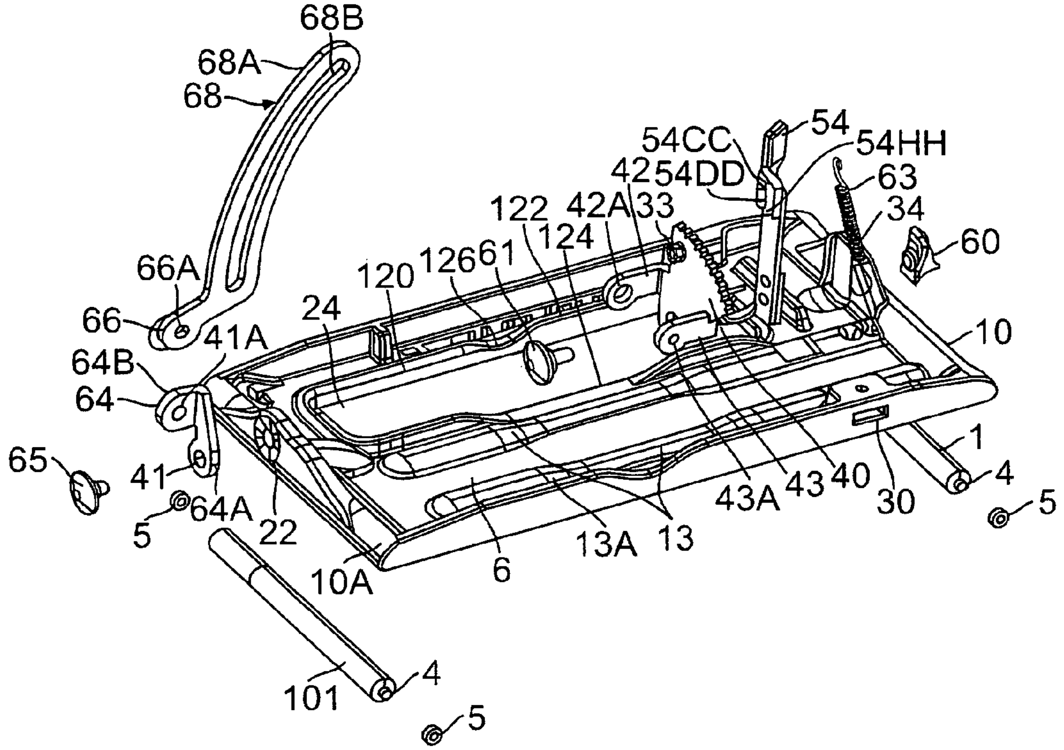
FIG. 4 is a rear perspective exploded view illustrating components of the present invention rolling plate assembly.
Figure 5:
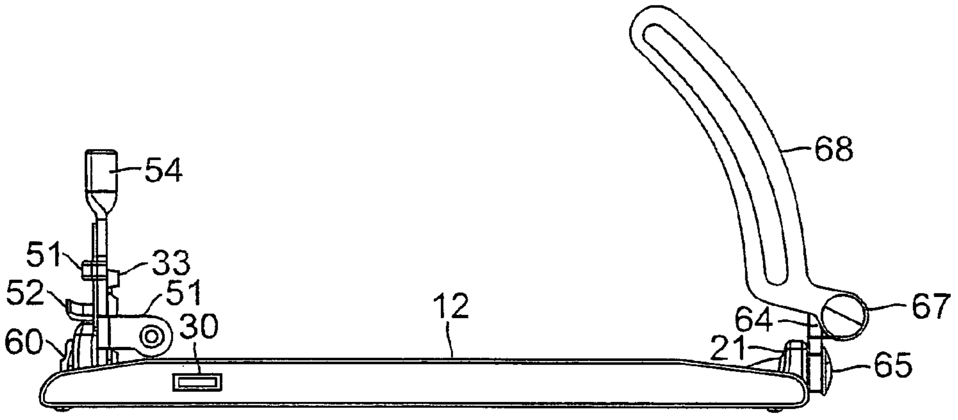
FIG. 5 is a side elevational view of the present invention rolling plate assembly.
Figure 6:
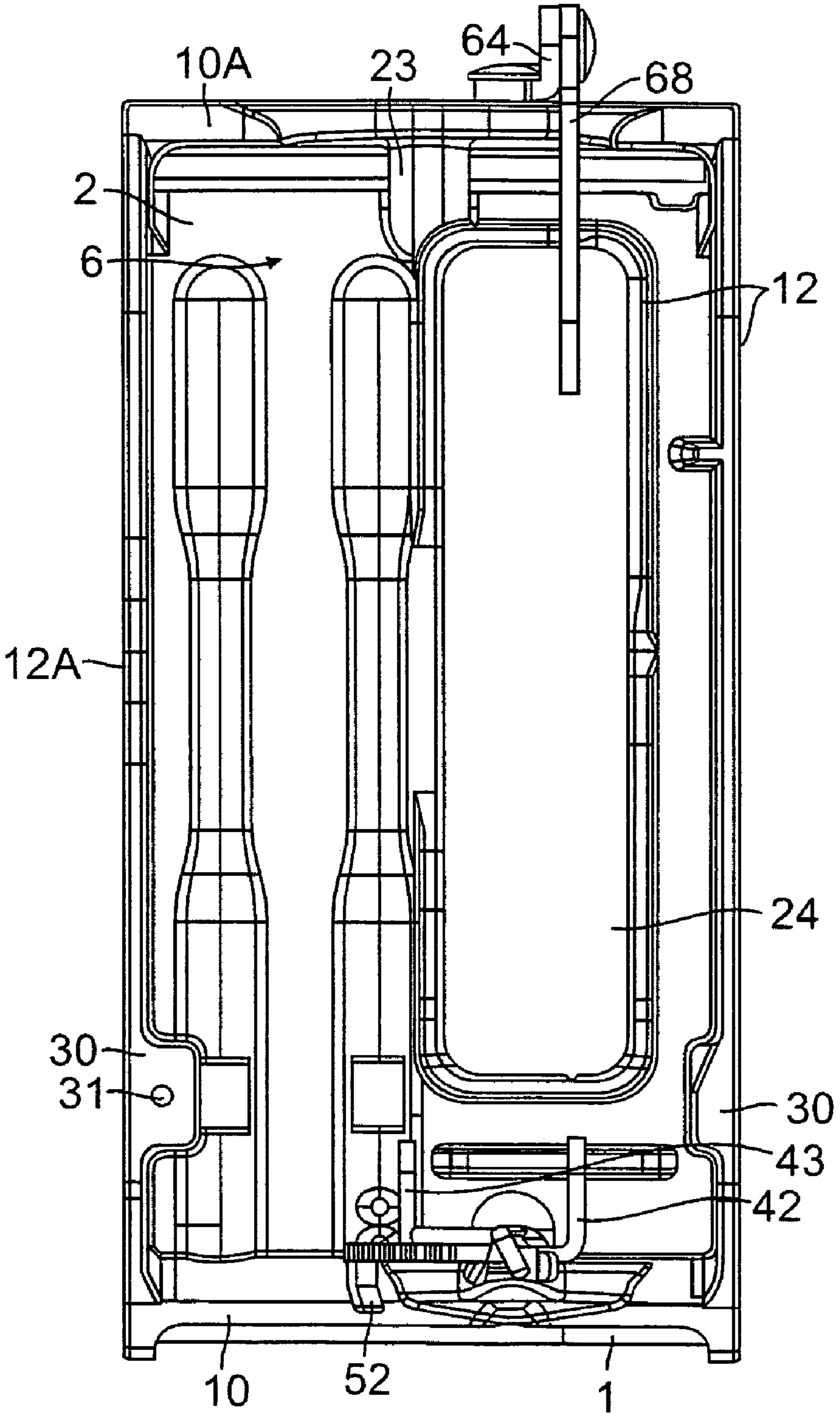
FIG. 6 is a top plan view of the base of the present invention rolling plate assembly.
Figure 7:
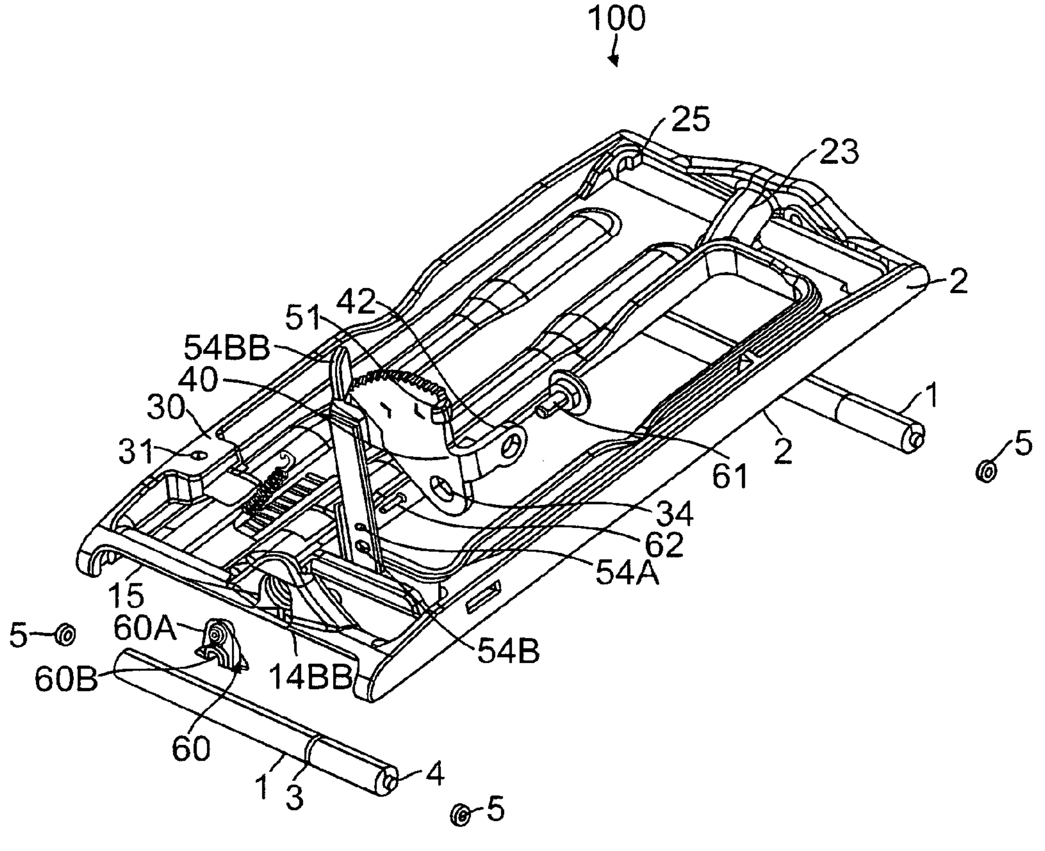
FIG. 7 is a partially exploded perspective view of the present invention rolling plate assembly.
Figure 8:
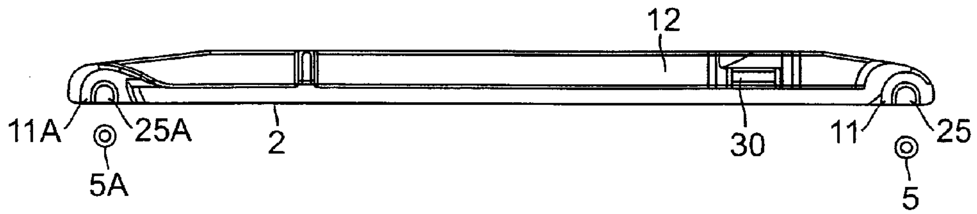
FIG. 8 is a cut away side view of the base of the present invention rolling plate assembly.

Referring to FIG. 1, there is illustrated a front perspective view of the fully assembled improved rolling plate assembly 100. In FIG. 2 there is illustrated a rear perspective view of the fully assembled improved rolling plat assembly 100. In FIG. 3 there is illustrated a an exploded front perspective view of the rolling plate assembly 100. In FIG. 4 there is illustrated an exploded rear perspective view of the rolling plate assembly 100. In FIG. 5 there is illustrated a side elevational view of the rolling plate assembly 100. In FIG. 6 there is illustrated a top plan view of the base or skate plate 2 and additional components of the rolling plate assembly 100. In FIG. 7 there is illustrated a partially exploded perspective view of the base or skate plate 2 and some additional components of the rolling plate assembly 100.

Referring to FIGS. 1 through 7, a significant improvement of the present invention rolling plate assembly 100 is that the base or skateplate 2 is formed or molded out of a single piece of fiber reinforced plastic. The base 2 of the improved rolling plate assembly 100 assembly comprises a front wheel housing member 10 and a rear wheel housing member 10A which is a mirror image of the front wheel housing member 10. As will be discussed in detail below, the front wheel housing member 10 removably retains a rolling wheel 1 and similarly, second wheel housing member 10A also removably retains a rolling wheel 101. As illustrated in FIGS. 1 and 2, wheel housing members 10 and 10A are parallel to each other and the respectively retained wheels 1 and 101 are also parallel to each to each other.

The one piece constructed base 2 includes the front wheel housing member 10 and the parallel rear wheel housing member 10A which are interconnected by a first longitudinal sidewall 112 which has a raised stabilizer fin 12 and a parallel oppositely disposed second longitudinal sidewall 112A which has a raised stabilizer fin 12A. As illustrated in FIGS. 1 and 2, first raised stabilizer fin 12 has a straight top surface while second raised stabilizer fin 12A has a top surface 114A which has an arcuate dip 114AA. A portion of the base 2 is further comprised of a horizontal flat plate section 6 extending between front wheel housing member 10 and rear wheel housing member 10A. Formed into flat plate section 6 are a pair of parallel stabilizer tubes including a first stabilizer tube 13 and a second stabilizer tube 13A. Second stabilizer tube 13A is located closer to second longitudinal sidewall 112A. The flat plate 6 extends for the entire interior area bounded by the front wheel housing member 10, the rear wheel housing member 10A, the first longitudinal sidewall 112 and the second longitudinal sidewall 112A. Formed into the flat plate 6 is a saw blade penetration slot 24 which is bounded by circumferential interior sidewall 120 which extends perpendicularly upward from flat plate section 6 and terminates in a top surface 122 which acts as a third stabilizer fin. The top surface 122 of the interior portion of circumferential wall 120 has an elongated recess 124 and the top surface 122 of the exterior portion of circumferential wall 120 has a smaller recess 126. All of these components of the base 2 including the front wheel housing 10, the rear wheel housing 10A, the first elongated sidewall 112 and its stabilizer fin top 12, the second elongated sidewall 112A and its stabilizer fin top 12A, the flat plate 6, the interior circumferential wall 120 and its top surface stabilizer fin 122 are all formed of a single piece of material which preferably is injection molded fiber enriched plastic. This design greatly simplifies the frame assembly as described in the inventor's previous embodiments of the invention, reducing many separate component parts and greatly reducing the cost of manufacture and assembly. The injection molded plastic provides much lighter weight and reduced manufacturing costs as compared to a metal base. It is possible to make the base 2 and all of its components out of metal or any other suitable material such as polyurethane. The stabilizer fins 12 and 12A and 122 and the stabilizer tubes 13 and 13A provide greater torsional strength.

As will be discussed below, the front housing member 10 supports means to retain a portion of a power tool such as a rotary power saw and the rear housing member 10A also supports means to retain another portion of the power tool such as a rotary power saw.

An additional significant improvement in the present invention rolling plate assembly 100 is the redesign of the wheels and how they are retained in the housings 10 and 10A, which will now be described in detail.

As best illustrated in the views of FIGS. 1, 3 and 4, the front wheel 1 is located below and extends toward the leading edge of front wheel housing 10. Similarly, the rear wheel 101 is located below and extends toward the rear edge of rear wheel housing 10A. By having one long wheel 1 instead of two shorter aligned wheels in the front and one long wheel 101 instead of two shorter aligned wheels in the rear, as in the embodiment of application Ser. No. 11/413,994, there is more rolling surface for the improved rolling plate assembly 50. As a result, there is more friction of the wheels 1 and 101 against the surface on which it rolls and therefore this increased wheel length and additional frictional surface provides more stability to the improved rolling plate assembly 100 so that the improved rolling plate assembly 100 will not veer out of the cutting line as a cut is being made.

Figure 9:
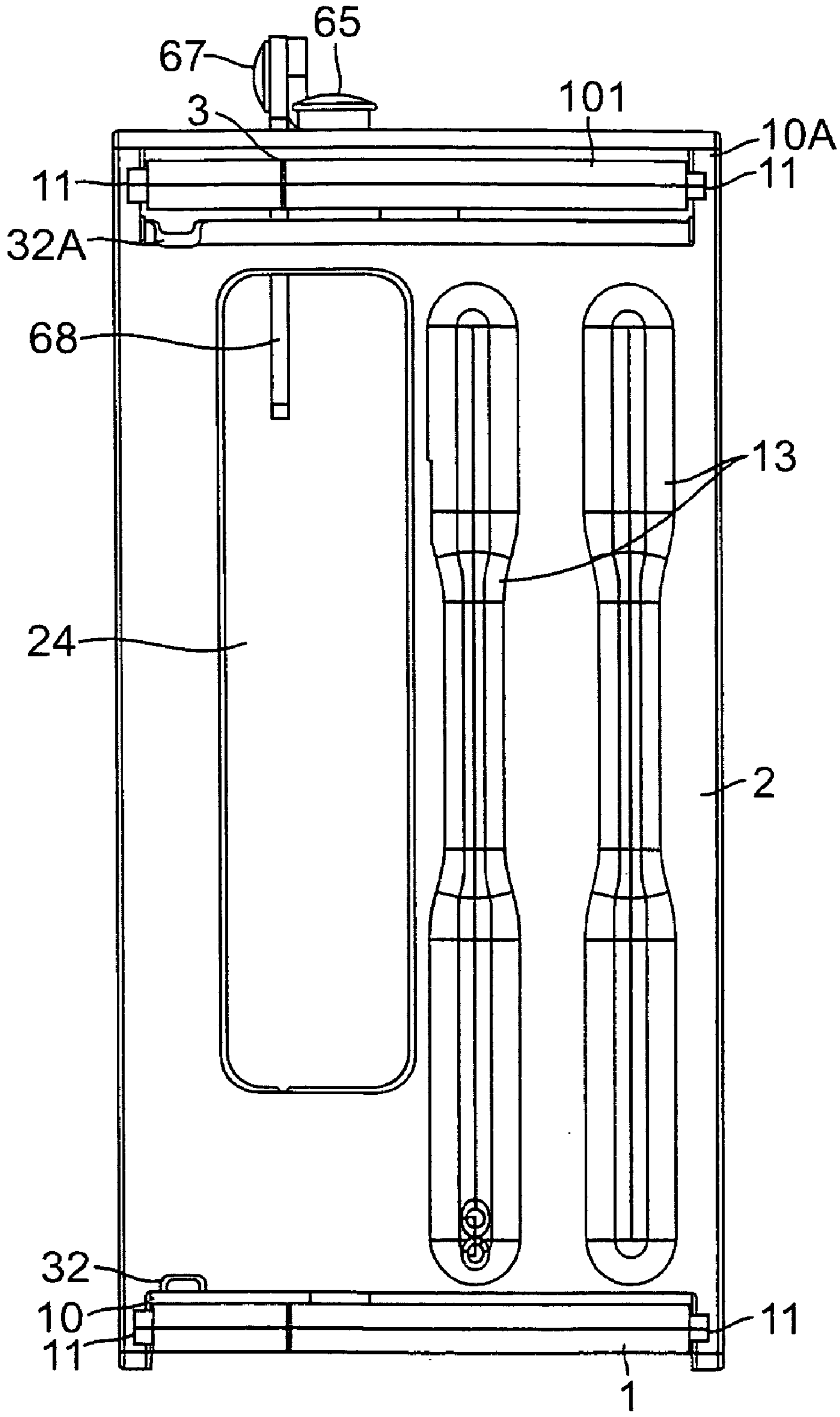
FIG. 9 is a bottom plan view of the base of the present invention rolling plate assembly.

In addition to the improvement in the length of a single wheel 1 or 101, the method of attachment and removal of each wheel is also significantly improved. In addition to FIGS. 3, 4 and 7, FIG. 8 is a cut away side view of the base 2 to better illustrate the wheel bearing improvement of the present invention. The improvement of the base 2 being made out of fiber reinforced resin provides sufficient flexibility to eliminate the spring channel and the leaf spring in the wheel bearing seat. Front housing 1 has a pair of oppositely disposed wheel bearing seats 25 in a respective bearing pocket 11 and rear housing 101 has a pair of oppositely disposed wheel bearing seats 25A in a respective bearing pocket 11A. Similarly, the wheel 101 comprises an interior wheel shaft 4A terminating in a wheel bearing 5A at each end. The wheel 1 is preferably made of out of polyurethane or rubber and surrounds the wheel shaft 4. Similarly, the wheel 101 is preferably made out of polyurethane or rubber and surrounds the wheel shaft 4A. Due to the flexibility of the fiber reinforced resin, it is easy to install and remove the wheel 1 by inserting the wheel bearings 5 into the wheel bearing seats 25 and pressing to create a strong rotatable wheel support. Similarly, due to the flexibility of the fiber reinforced resin, it is easy to install and remove the wheel 101 by inserting the wheel bearings 5A into the wheel bearing seats 25A and pressing to create a strong rotatable wheel support. Referring to FIG. 9 which is a bottom plan view of a portion of the base 2, an additional improvement of the present invention is the addition of a molded channel 32 into the bottom of the front wheel housing 10 and a comparable molded channel 32A into the bottom of rear wheel housing 10A. The channel 32 enables a flat instrument such as knife to be inserted through the channel 32 which functions as a wheel pop cutout so that the instrument can be inserted between the interior of front wheel housing 10 and the wheel 1 to pop-out the wheel 1 from the housing 10. Similarly, the channel 32A enables a flat instrument such as knife to be inserted through the channel 32A which functions as a wheel pop cutout so that the instrument can be inserted between the interior of rear wheel housing 10A and the wheel 101 to pop-out the wheel 101 from the housing 10A. The flexibility of the improved fiber reinforced resin permits the wheels 1 and 101 to be removed by hand pressure and the addition of the wheel pop cutouts 32 and 32A provide additional features to facilitate the wheel removal.

As illustrated in FIG. 1, the front wheel 1 is on the leading transverse edge 1A of housing 10 as opposed to below and/or behind the leading edge as in previous designs. Wheel 1 surrounds wheel shaft 4. A cut mark 3 is placed on the wheel 1 so as to provide the carpenter with a line as the saw is moved forwardly on the workpiece. In addition, a secure rolling motion of the frame 40 is provided with the front wheel 1 extending out of the front or leading transverse side 1A of the front wheel housing 10. As illustrated in FIG. 26, a multiplicity of markings such as number denominations 430, 432, 434 and 438 which, by way of example, can be 3 inches, 2 inches, 1 inch, number 436 which is zero and number 438 which is 1 inch on the other side or zero, are also placed on the wheel 1 (or 201 see FIG. 25) so as to provide the carpenter with a line for an exact cut as the saw if moved forwardly on the workpiece. The marks 430, 433, 434, 436 and 438 can also be metric. The 45 degree cut mark is 446.

The present housing and wheel design greatly simplify the housing and wheel design of the previous embodiment disclosed in application Ser. No. 11/413,994. Numerous components of the wheels and the housings have been eliminated, thereby greatly simplifying the design and reducing costs.

In the preferred embodiment, the wheels 1 and 101 are made of rubber or other material which can achieve a traction and protection on a smooth surface. In one embodiment, each wheel can be approximately one-half (½) inch in diameter and therefore extends by approximately one-eighth (⅛) inch below the lower surface of the housing members 10 and 10A. The range of wheel diameters can range between three-eighths (⅜) inch to three-quarters (¾) of an inch. The wheels 1 and 101 are preferably made of rubber but can also be made of other materials such as polyurethane. The key feature of the wheels 1 and 101 is that they must be made of materials which have good lateral traction on a smooth surface such as a piece of plywood or a 2×4. One problem discussed in the prior art is that a smooth plate affixed to the rotary power saw can slip sideways and cause binding of the rotary saw which results in kickback. The traction of the present invention wheels significantly reduces any lateral movement of the rotary power saw as it cuts through a workpiece and thereby significantly reduces the possibility of kickback. In addition, by having the wheels 1 and 101 within the housings 10 and 10A, the strength of the attachment of the wheels is increased since the weight of the saw pushes down on the assembly to help retain the wheels within the assembly as the saw is moved.

An additional significant improvement in the present invention rolling plate assembly 100 is the redesign of the wheels and how they are retained in the modified front housing 210 and modified rear housing 210A.

Figure 25:
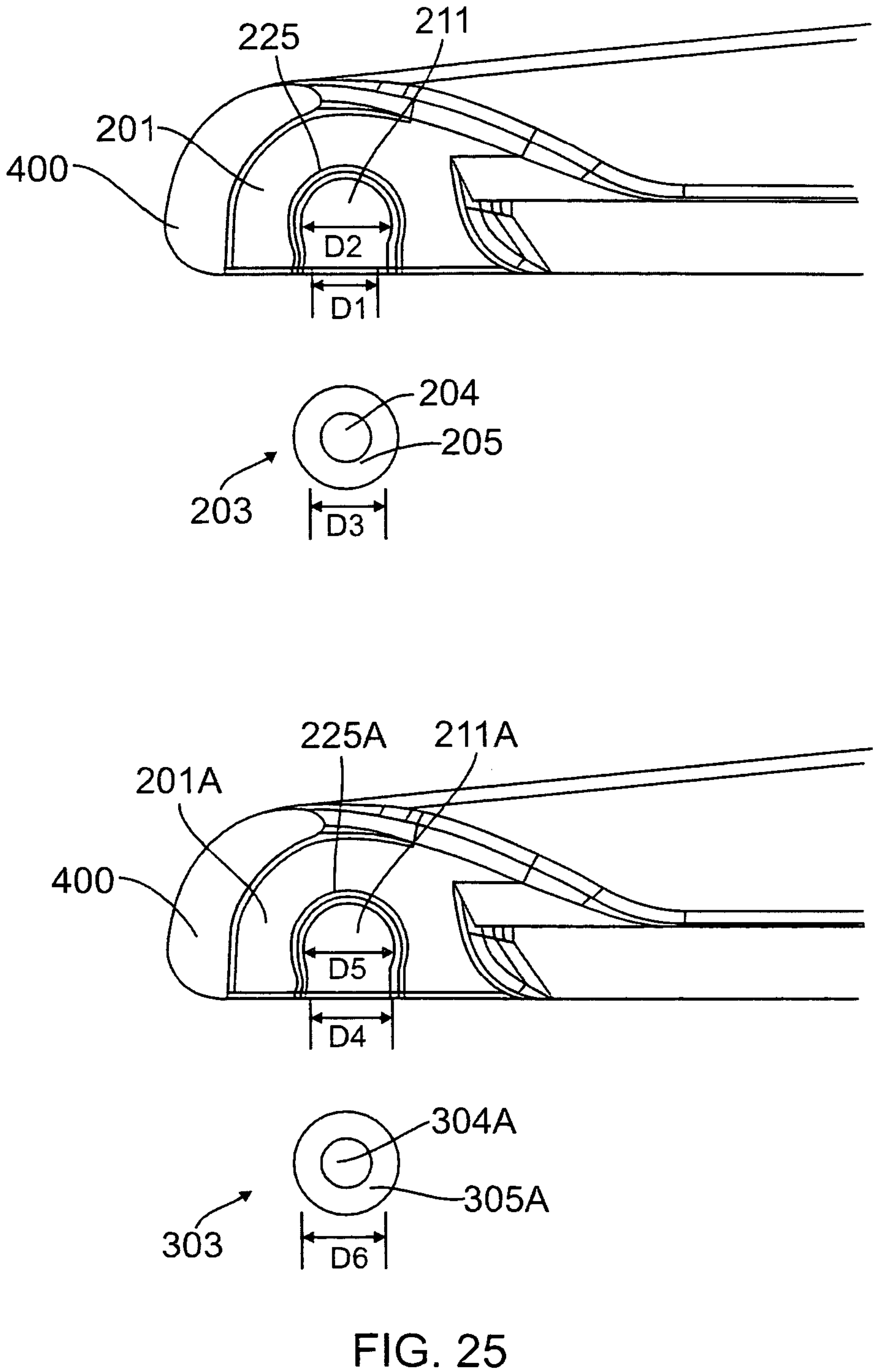
FIG. 25 is an enlarged partial cut-away side view of the base of the present invention rolling plate assembly to illustrate the molded metal bumper on the front housing and to illustrate the shape of the bearing seats in the front housing member and rear housing member of the base.
Figure 26:
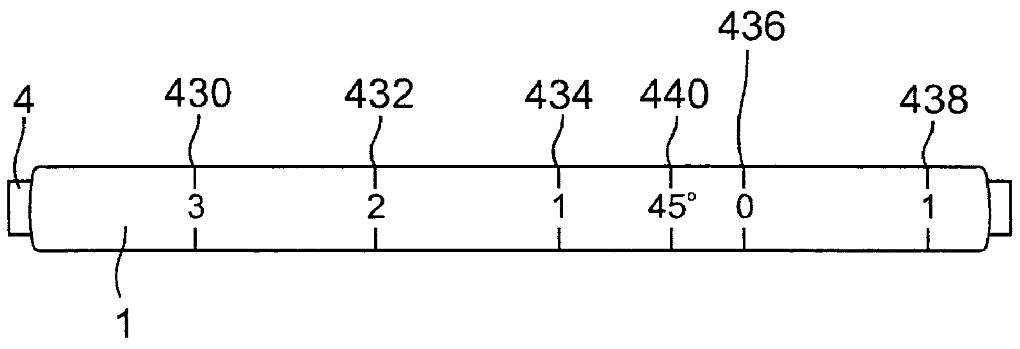
FIG. 26 is a illustration of measuring marks on the front and rear wheels of the rolling plate assembly.

As best illustrated in the cross-sectional exploded view of FIG. 25, base 2 being made out of fiber reinforced resin or fiber reinforced plastic provides sufficient flexibility to eliminate the spring channel and the leaf spring in the wheel bearing seat. Front housing 201 has a pair of oppositely disposed wheel bearing seats 225 in a respective bearing pocket 211 and rear housing 201A has a pair of oppositely disposed wheel bearing seats 225A in a respective bearing pocket 211A. The wheel 203 comprises an interior wheel shaft 204 terminating in a wheel bearing 205 at each end. Similarly, the wheel 303 comprises an interior wheel shaft 304A terminating in a wheel bearing 305A at each end. The wheel bearing 205 is preferably made of out of polyurethane or rubber and surrounds the wheel shaft 204. Similarly, the wheel bearing 305A is preferably made out of polyurethane or rubber and surrounds the wheel shaft 304A.

An improvement is that the entrance diameter “D1” of bearing seat 225 is smaller than the interior diameter “D2” of bearing seat 225. The diameter “D3” of wheel bearing 205 is approximately the same size as diameter “D2”. Due to the flexibility of the fiber reinforced resin, it is easy to install and remove the wheel 203 by inserting the wheel bearings 205 into the wheel bearing seat 225 and pressing to overcome the smaller diameter “D1” and rest comfortably in interior diameter “D2” of bearing seat 225. Due to the smaller diameter “D1” of the entrance of bearing seat 225, the wheel 203 will not inadvertently fall out of bearing seat 225 and must be forced out.

Similarly, an improvement is that the entrance diameter “D4” of bearing seat 225A is smaller than the interior diameter “D5” of bearing seat 225A. The diameter “D6” of wheel bearing 305A is approximately the same size as diameter “D5”. Due to the flexibility of the fiber reinforced resin, it is easy to install and remove the wheel 303 by inserting the wheel bearings 305A into the wheel bearing seat 225A and pressing to overcome the smaller diameter “D4” and rest comfortably in interior diameter “D5” of bearing seat 225A. Due to the smaller diameter “D4” of the entrance of bearing seat 225A, the wheel 303 will not inadvertently fall out of bearing seat 225A and must be forced out.

Referring to FIG. 9, as with the previous embodiment, a molded channel is formed into the bottom of the front wheel housing 210 and a comparable molded channel is formed into the bottom of rear wheel housing 210A. The channel enables a flat instrument such as knife to be inserted through the channel which functions as a wheel pop cutout so that the instrument can be inserted between the interior of front wheel housing 210 and the wheel 201 to pop out the wheel 201 from the housing 210. Similarly, a channel enables a flat instrument such as a knife to be inserted through the channel which functions as a wheel pop cutout so that the instrument can be inserted between the interior of rear wheel housing 310A and the wheel 301 to pop out the wheel 301 from the housing 210A. The flexibility of the improved fiber reinforced resin permits the wheels 203 and 303 to be removed by hand pressure and the addition of the wheel pop cutouts provides additional features to facilitate the wheel removal.

The second significant improvement in the present invention rolling plate assembly 100 is the apparatus by which the cutting tool is retained and the apparatus by which the angle of orientation of the cutting tool relative to the assembly 100 is adjusted. This will now be described in detail.

Figure 10:
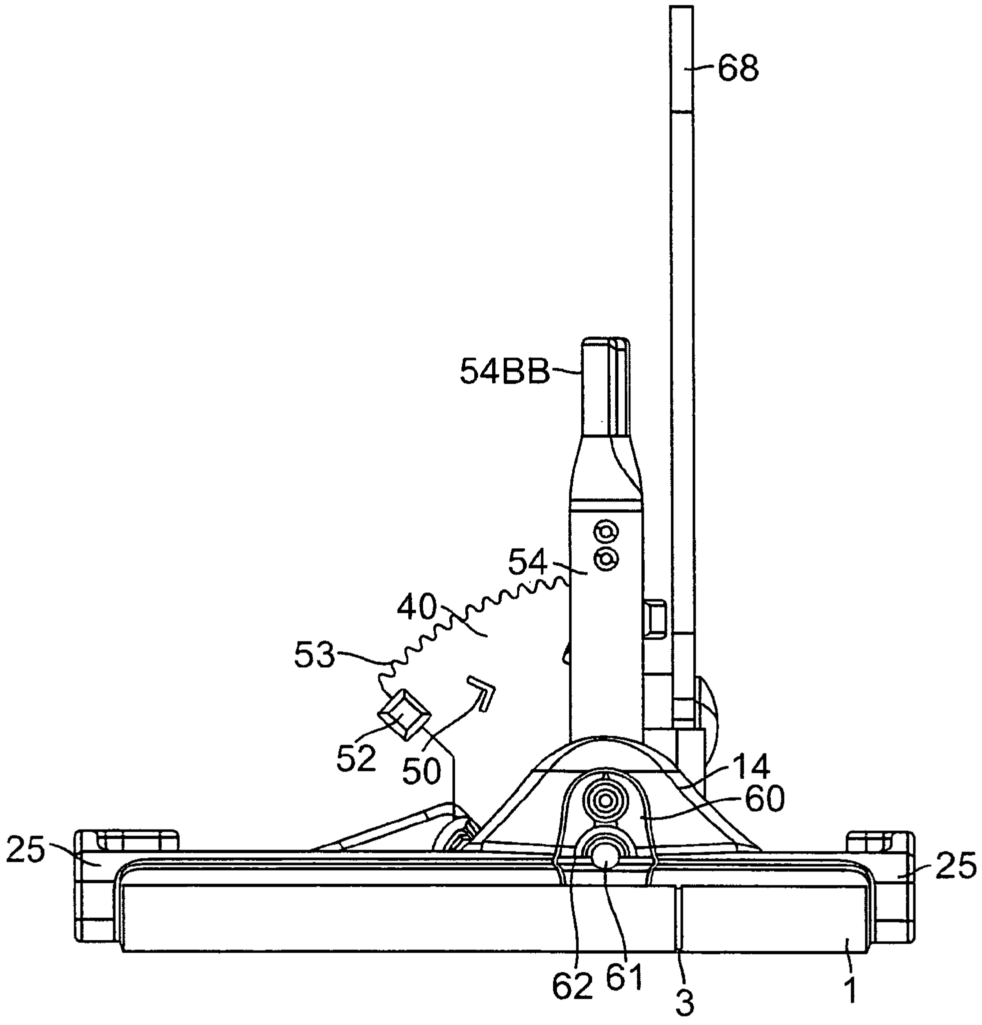
FIG. 10 is a front elevational view of a portion of the present invention rolling plate assembly.
Figure 11:
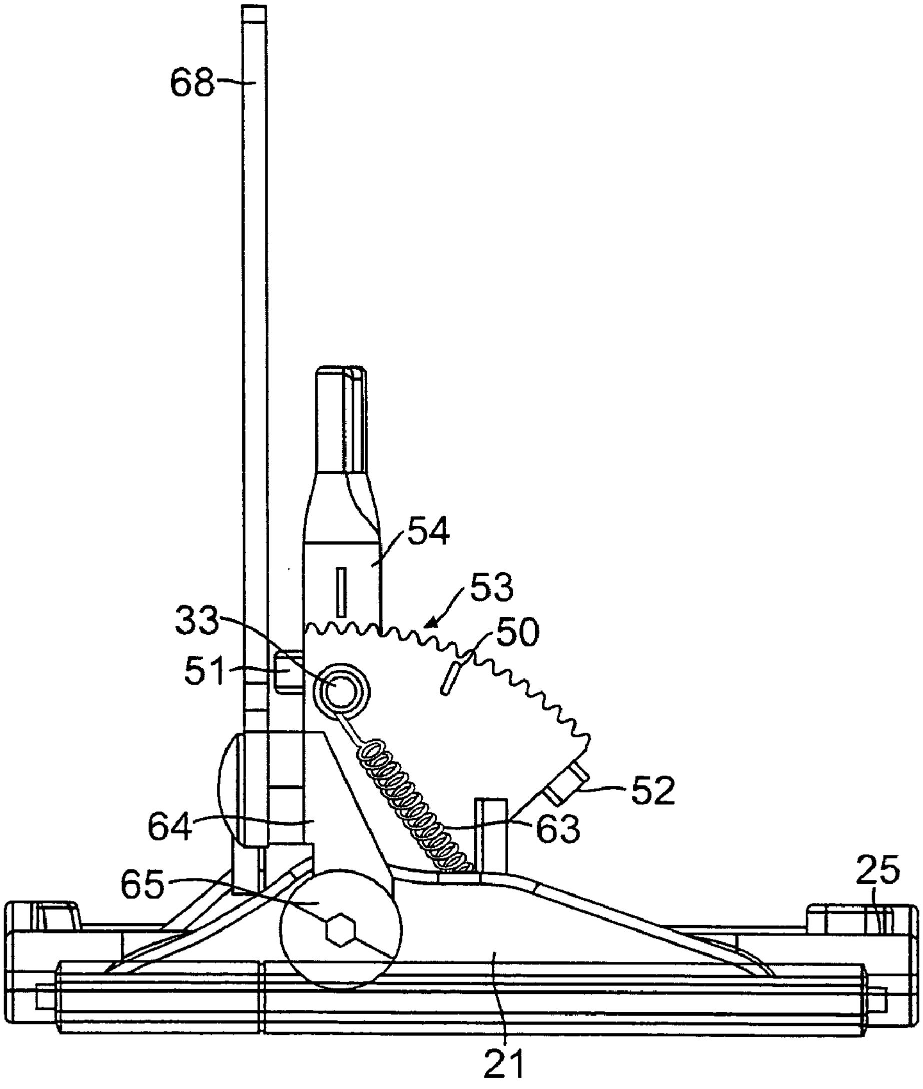
FIG. 11 is a rear elevational view of a portion of the present invention rolling plate assembly.
Figure 12:
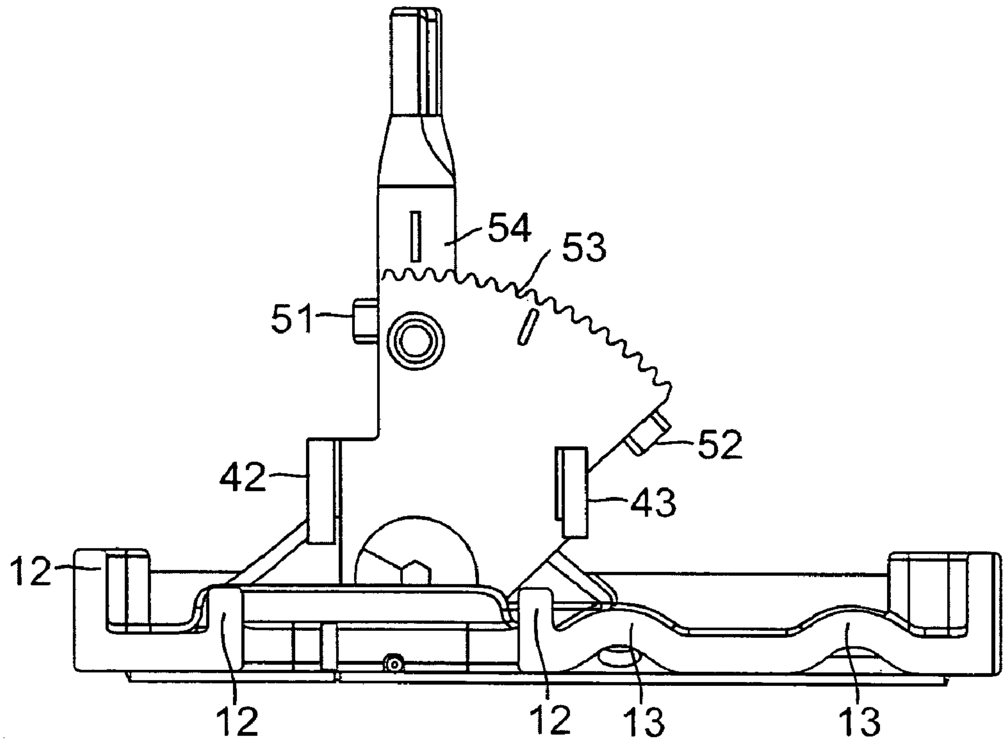
FIG. 12 is a front elevational cutaway view of the present invention rolling plate assembly.
Figure 13:
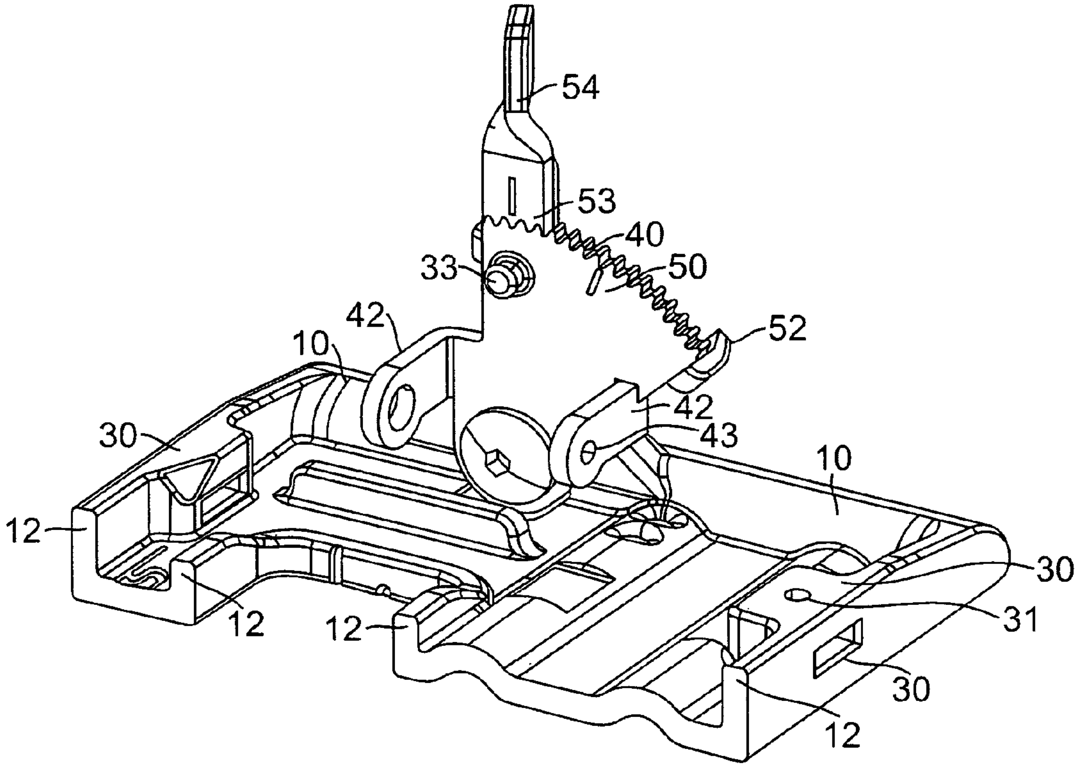
FIG. 13 is a rear perspective cutaway view of the present invention rolling plate assembly.
Figure 14:
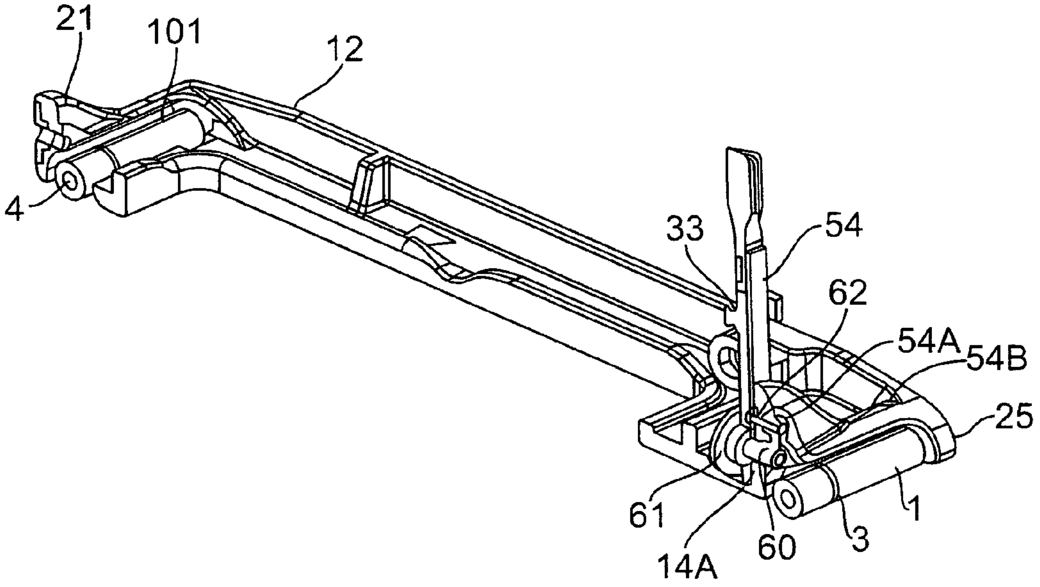
FIG. 14 is a side cutaway view of a portion of the present invention rolling plate assembly.

The means by which a rotary power saw is attached to the rolling plate assembly will now be described. First, the means by which the rotary power saw is attached to the front of the rolling plate assembly will be described. FIG. 10 is a front elevational view of a portion of the present invention rolling plate assembly 100. FIG. 11 is a rear elevational view of a portion of the present invention rolling plate assembly 100. FIG. 12 is a front elevational cutaway view and FIG. 13 is a rear perspective cutaway view of a portion of the present invention rolling plate assembly. FIG. 14 is a side cutaway view of a portion of the present invention rolling plate assembly. Referring to FIGS. 1, 3, 4, 5, and 10 through 14, attached to the interior of front housing 10 is a front gear housing 14 which as illustrated extends vertically above front housing 10. The gear housing 14 has an interior recessed portion 14A which functions as an adjustment lever housing. Extending transversely through front gear housing 14 is a front gear insert housing 15 having an upper opening 15A and a lower opening 15B extending therethrough. Retained within the gear housing 14 is a flexible adjustment member 54 having an upper opening 54A and a lower opening 54B. The recess 14BB in the gear housing 14 receives a gear system threaded insert 60 having an upper threaded opening 60A and a lower opening 60B. A lower adjustment lever attachment screw 62 attaches the flexible adjustment member 54 to the gear housing 14 by being inserted through opening 53A and threaded into opening 60A of insert 60. Flexible adjustment member 54 is flexible and can be bent toward first wheel housing 10.

A bevel adjustment lever 54BB is illustrated in FIGS. 1 through 3, 7 through 14, and has a pair of spaced apart openings 54CC and 54DD which are respectively aligned with openings 54EE and 54FF in flexible adjustment member 54. Bevel adjustment lever 54BB is attached to the flexible adjustment member 54 by a pair of upper lever attachment screws which respectively extend through aligned openings 54CC and 54EE1 and aligned openings 54DD and 54FF. Bevel adjustment lever 54BB has a handle 54GG on its upper portion and a multiplicity of calibration teeth 54HH extending along its lower surface.

A calibrated bevel bracket 40 is illustrated in FIGS. 1 through 3, and 7 through 14, and is a wedge shaped member having a 45 degree arc and having a multiplicity of mating calibration teeth 53 extending along its upper arcuate surface. At its opposite lower end, the calibrated bevel bracket 40 has a bevel bracket center hole or shoulder bolt hole 34. Flexible adjustment member 54 has a lowermost opening 54B. Front gear housing 14 has a lower opening 14BB and insert 60 has a lower threaded opening 60B. Opening 14BB, bevel bracket center hole 34, and threaded opening 60B are aligned and calibrated bevel bracket 40 is attached to the flexible adjustment member 54 and gear housing 14 by gear shoulder bolt 61 extending through the aligned openings 54B, 14BB, and threaded into opening 60B. Extending transversely to calibrated bevel bracket 40 and extending toward rear housing 10A are a pair of parallel spaced apart front motor mount brackets, bracket 42 having an opening 42A and bracket 42 having a threaded opening 43. Calibrated bevel bracket 40 also has a transverse attachment hole adjacent its upper portion near the mating calibration teeth 53 which attachment hole receives a gear return coil spring hook 33. Referring to FIG. 2, center plate 6 of base 2 has an attachment opening 63A to receive one end of a gear return coil spring 63 which is connected at its opposite end to gear return coil spring hook 33 on calibrated bevel bracket 40. When assembled as illustrated in FIGS. 1, 3, 10 and 11, the calibrated bevel bracket 40 is rotatably affixed to the flexible adjustment member 54 and front gear housing 14 so that the mating teeth 54HH of flexible adjustment member 54 come in contact with the mating teeth 53 of calibrated bevel bracket 40.

Referring to FIG. 7, calibrated bevel bracket 40 has a “90” degree positioning stop 51 and referring to FIG. 10, has a 45 degree positioning stop 52 which also serves as a handle along the opposite edge of the calibrated bevel bracket 40. Referring to FIGS. 7 and 10, the surface of calibrated bevel bracket 40 can have a multiplicity of calibration marks such as “22.5” degrees, 90 degrees and 45 degrees. The gear return coil spring 63 forces the calibrated bevel bracket toward the “90” degree positioning stop position. As will be described below, when in the “90” degree position, the saw blade will make a straight line cut. The orientation of the calibrated bevel bracket 40 and the attached saw attachment flanges 42 and 43 can be rotated to an alternative arcuate orientation by pressing the handle 54BB of flexible adjustment member 54 toward first housing 10 so that the mating teeth 54HH and 53 are disengaged and rotating the calibrated bevel bracket 40 in the clockwise direction against the force of the coil spring 63 and releasing the handle 64BB so that the mating teeth 54HH and 53 are once again engaged at the desired angle of orientation of the calibrated bevel bracket 40. The angle of orientation can be rotated to a maximum angle of 45 degrees where the calibrated bevel bracket 40 is restrained from further arcuate rotation by the 45 degree positioning stop 52.

Figure 15:
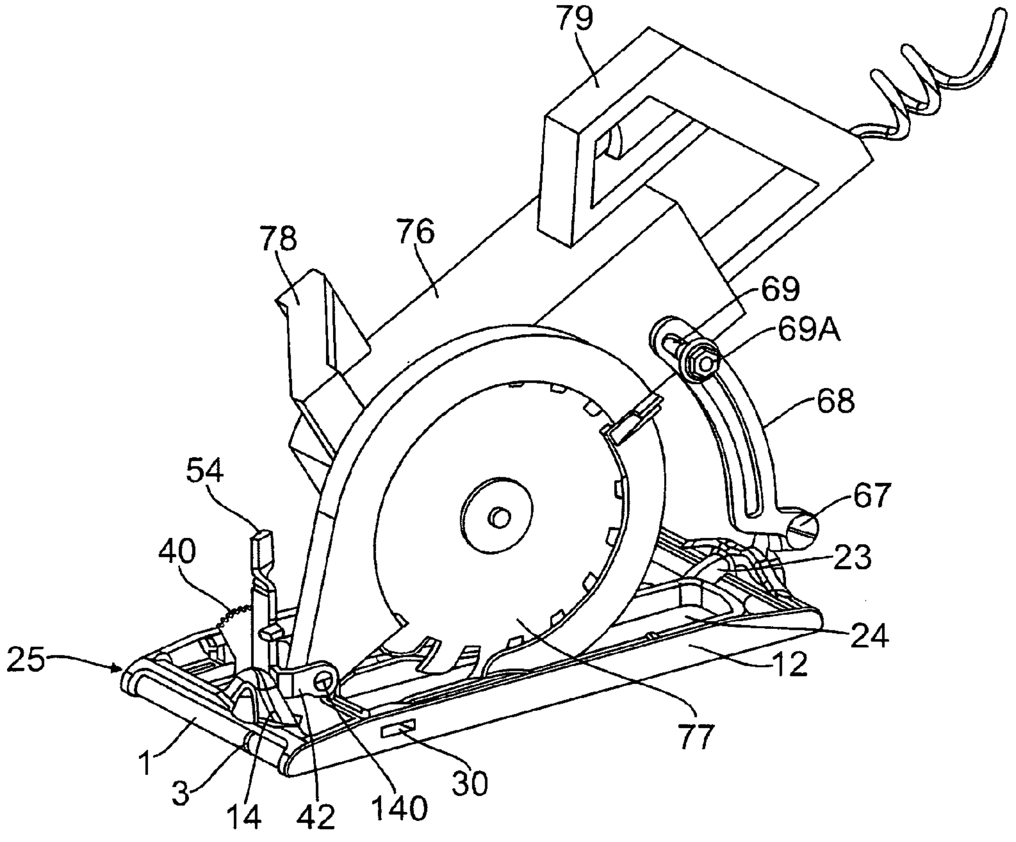
FIG. 15 is a side perspective view of a power circular saw attached to the present invention rolling plate assembly.
Figure 16:
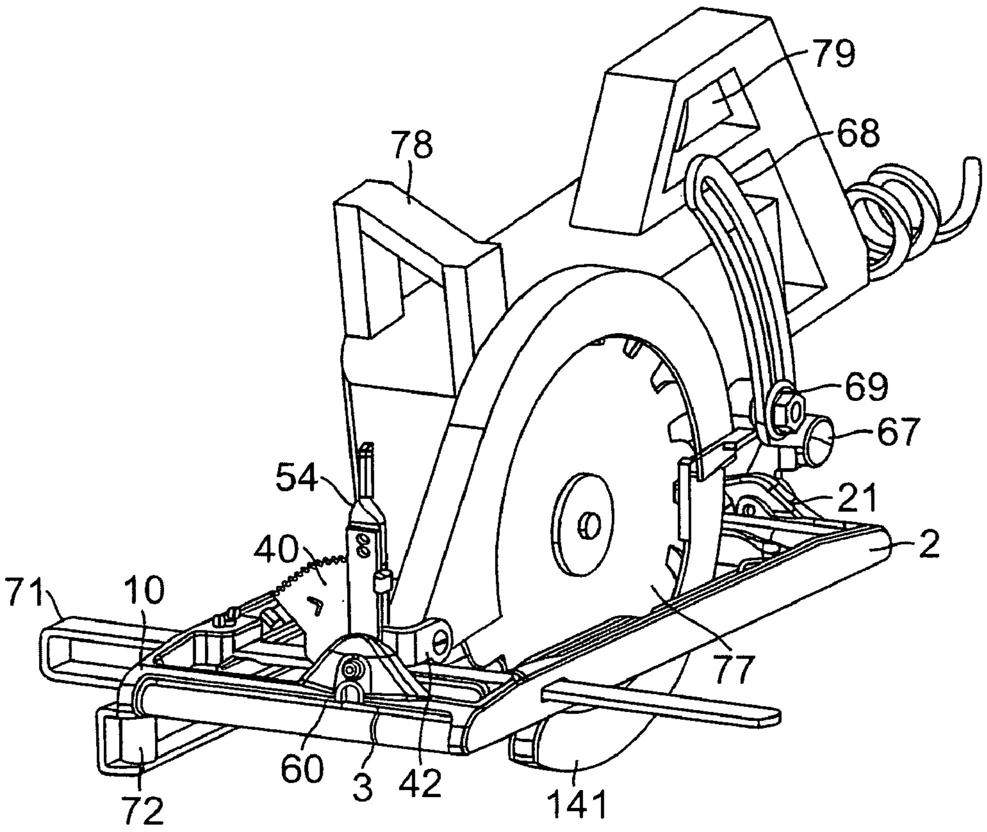
FIG. 16 is a front perspective view of a power circular saw attached to the present invention rolling plate assembly.
Figure 17:
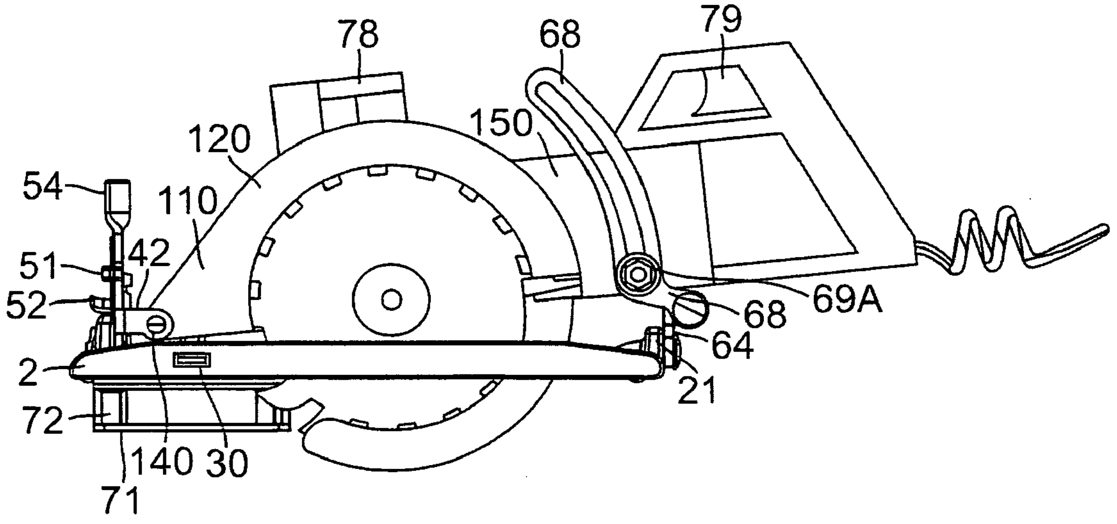
FIG. 17 is a side elevational view of a power circular saw attached to the present invention rolling plate assembly.
Figure 18:
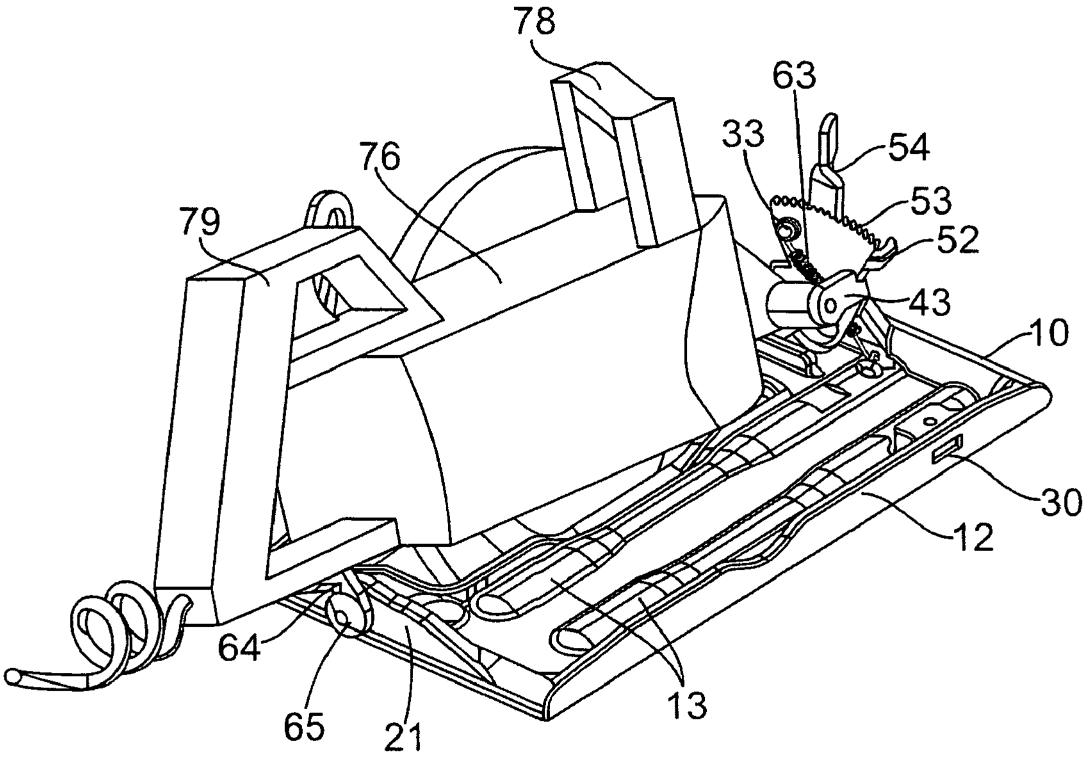
FIG. 18 is a rear perspective view of a power circular saw attached to the present invention rolling plate assembly.
Figure 19:
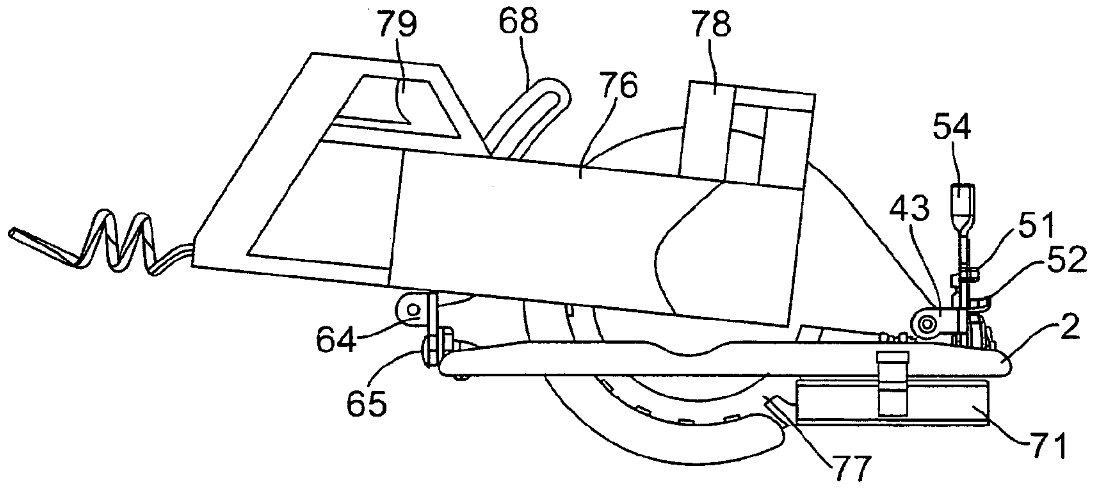
FIG. 19 is a side elevational view of a power circular saw attached to the present invention rolling plate assembly, as viewed from the opposite side as viewed from FIG. 17.

The means by which the rotary power saw is attached to the rear of the rolling plate assembly will now be described. FIG. 15 is a side perspective view of a power circular saw attached to the present invention rolling plate assembly 100. FIG. 16 is a front perspective view of a power circular saw attached to the present invention rolling plate assembly 100. FIG. 17 is a side elevational view of a power circular saw attached to the present invention rolling plate assembly 100. FIG. 18 is a rear perspective view of a power circular saw attached to the present invention rolling plate assembly. FIG. 19 is a side elevational view of a power saw attached to the present invention rolling plate assembly, as viewed from the opposite side from the view of FIG. 17. Referring to FIGS. 2, 3 4, and 15 through 19, a tilt bracket housing 21 is formed as part of the base 2 and incorporated as part of rear wheel housing 10A and contains a transverse threaded opening 22. A tilt bracket 64 has a first vertical section 64A with an opening 41 and a transverse section 64B perpendicularly attached to the vertical section 64A and having a transverse opening 41A. The transverse section 64B has an opening 41A which is oriented at 90 degrees to opening 41. Referring to FIGS. 1 through 3 and FIG. 5, an arcuate plunge bracket or elevation bracket 68 has an arcuate section 68A with a interior arcuate slot 68B and a lower tail section 66 with a transverse opening 66A. Plunge bracket 68 is rotatably attached to transverse section 64B of tilt bracket 64 by aligning openings 41A and 66A and fastening the parts together by mating plunge bracket attachment screw 67 extending through openings 41A and 66A. The vertical section 64A of tilt bracket 64 is rotatably attached to the tilt bracket housing 21 by aligning openings 41 in vertical section 64A and opening 22 in tilt bracket housing 21 and fastening them together by inserting tilt bracket screw 65 through openings 41 and 22. Through this pair of rotatable connections, plunge bracket 68 can be rotated along the longitudinal direction of the improved rolling plate assembly 100 and can also be rotated along the widthwise or transverse direction of the improved rolling plate assembly 100.

Referring to FIGS. 15 through 19, there is illustrated a power circular saw 76 attached to the present invention rolling plate assembly 100 so as to make a straight line cut. The circular saw 76 has a saw blade 77, a saw handle 78 and a trigger handle 79. The saw 76 also has a transverse supporting member 110 which extends from the saw blade shield 120 which covers the saw blade 77. The transverse supporting member 110 has a pair of openings which are aligned with opening 42A in front motor mount bracket 42 and opening 43A in front motor mount bracket 43, in attachment flange 20 and opening 20C in attachment flange 20A. A threaded bolt 140 extends through aligned openings 42A, the openings in transverse supporting member and opening 43A and is threaded into opening 43A or alternatively secured with a nut. The rear end of the power circular saw 76 has a rear support member 150 which has a threaded opening to receive a fastening bolt 69 which extends through arcuate slot 68B in plunge bracket 68 and is fastened with a nut 69A.

Through the attachment to the improved rolling plate assembly 100 as illustrated in FIGS. 15 through 19, the power circular saw can be oriented in numerous desired orientations to facilitate various cuts with the saw blade 77. In the view shown in FIGS. 15 through 17, the calibrated bevel bracket 40 is at the “90” degree orientation and is against the 90 degree positioning stop 51. To change the angle of the saw blade to have a cut at an angle between 90 degrees (or straight) and up to 45 degrees, the handle 54GG is pushed toward front housing 10 so that intermeshing teeth 54HH and 53 are disengaged and then the calibrated bevel bracket 40 is rotated clockwise to the desired angle and then the handle 54GG is released so that the flexible adjustment member 54 snaps back to its original position and the mating teeth 54HH and 53 are intermeshed and locked. In addition, the tilt bracket screw 65 permits first vertical section 64A of tilt bracket 64 to rotate about tilt bracket housing 21 so that the angle of orientation of the rear of the saw blade 77 corresponds with the angle of orientation of the front of the saw blade 77.

With respect to the vertical orientation of the saw blade 77, the orientation can be achieved in one of two ways or using both methods. First, the fastening bolt 69 is loosened and slid along slot 68B of plunge bracket 68 to a desired vertical position along slot 68B to achieve a vertical angle of orientation of the saw blade 77. In addition, or alternatively, the tail section 66 of the plunge bracket 68 is rotated about plunge bracket attachment screw 67 to achieve a desired angle of orientation and is then fastened. Concurrently with one or both methods of vertical orientation, the threaded bolt is loosened so that the front end of the circular saw can be correspondingly rotated about threaded bolt 140 between saw attachment mounting brackets 42 and 43 to the corresponding vertical orientation.

In general use, the saw blade 77 and rip guide 141 extend through the opening or penetration slot 24.

The front and rear housing assembly 10 and 10A receive the cutting blade in between its wheels 1 and 101, so that the entire width of the saw is supported by the wheels during cutting.

The third significant improvement in the present invention rolling plate assembly 100 is the addition of a cutting guide which will now be described in detail.

Figure 20:
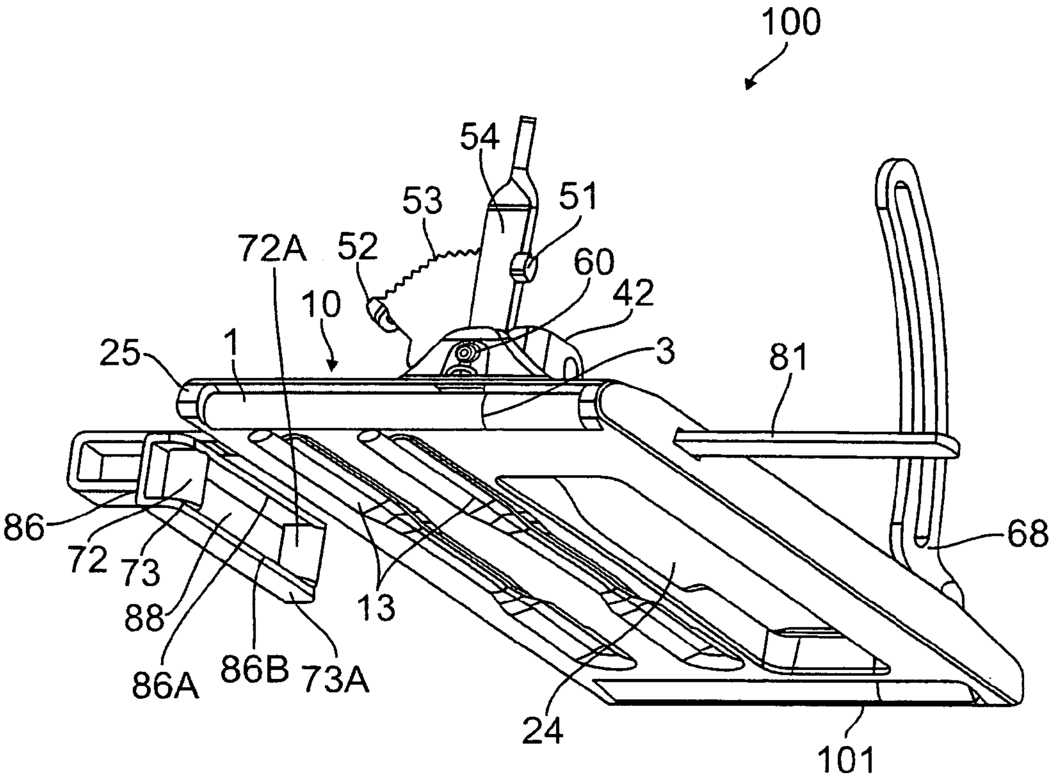
FIG. 20 is a bottom perspective view of the present invention rolling plate assembly illustrating the cutting guide in place.
Figure 21:
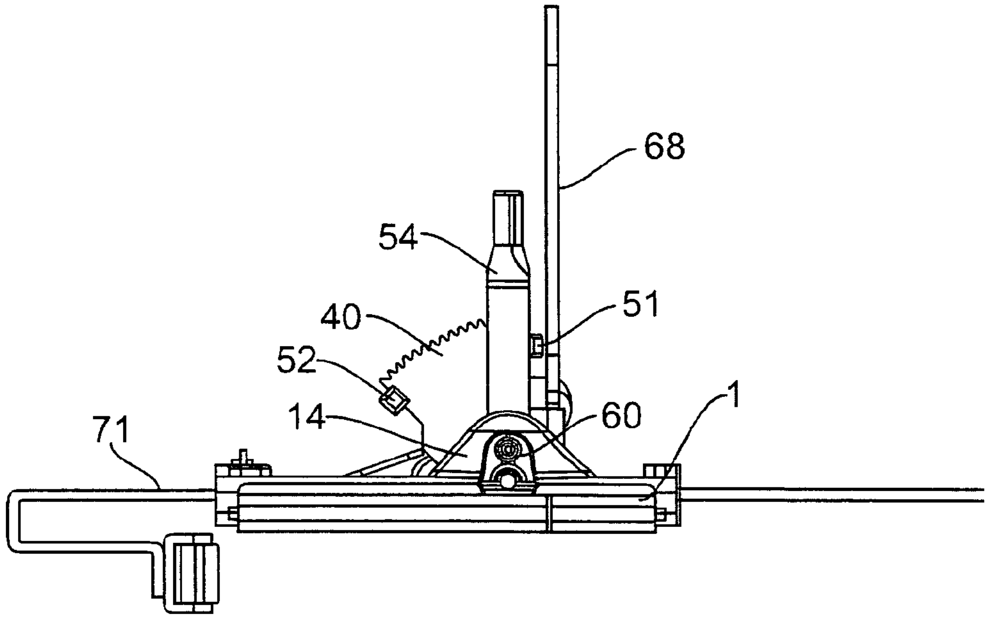
FIG. 21 is a front elevational view of the present invention rolling plate assembly illustrating the cutting guide in place.
Figure 22:
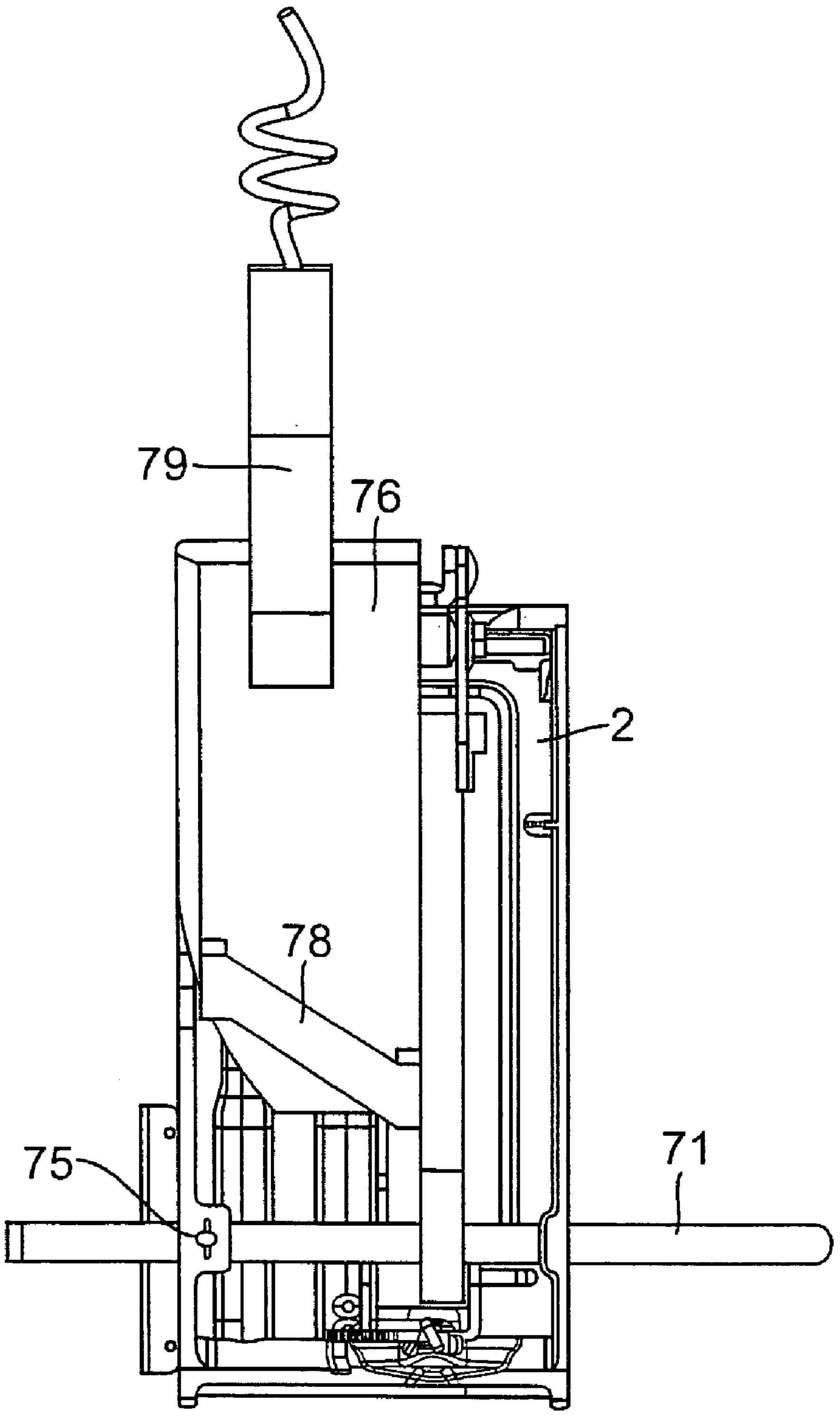
FIG. 22 is a top plan view of the present invention rolling plate assembly illustrating the cutting guide in place.
Figure 23:
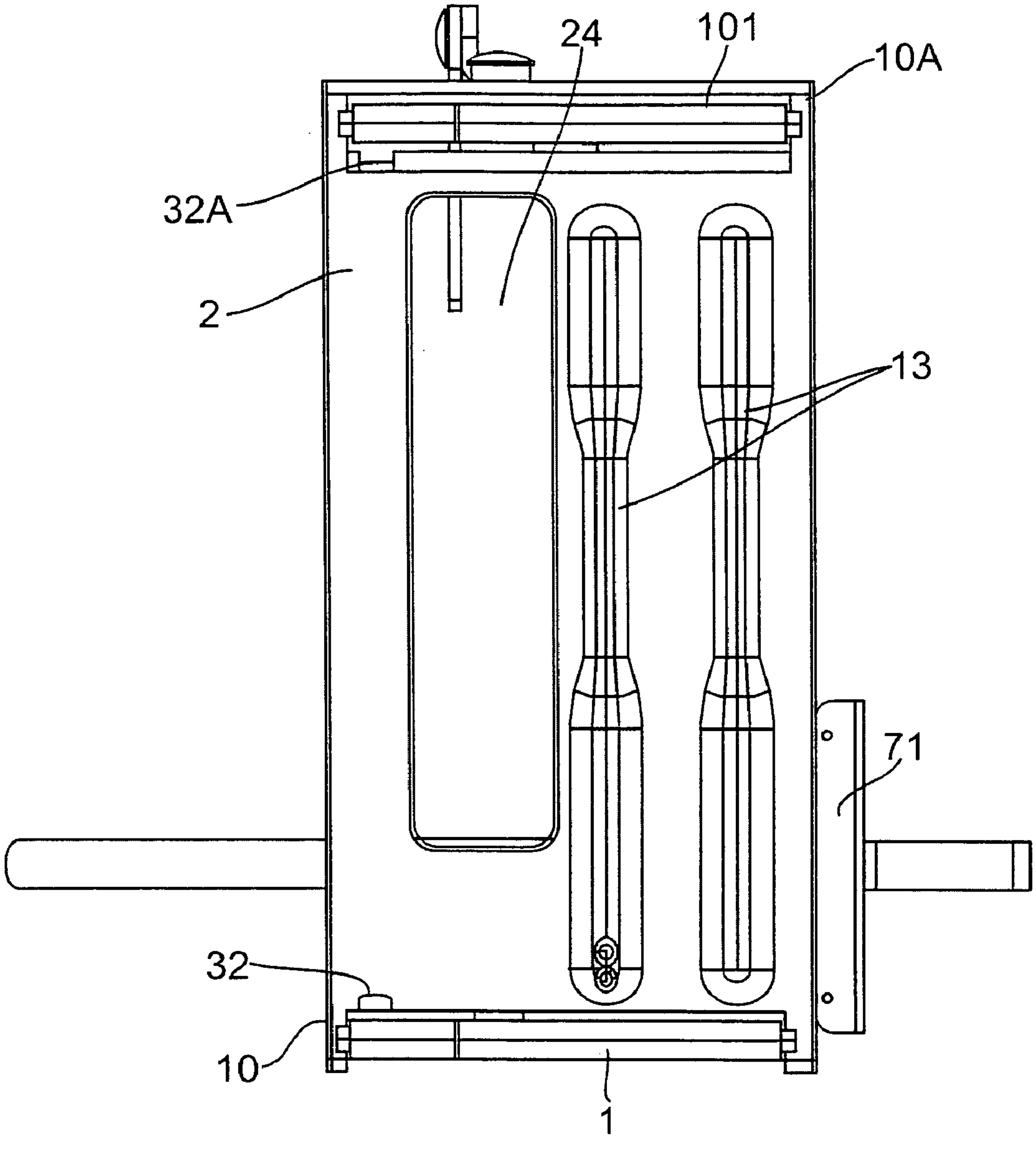
FIG. 23 is a bottom plan view of the present invention rolling plate assembly illustrating the cutting guide in place.
Figure 24:
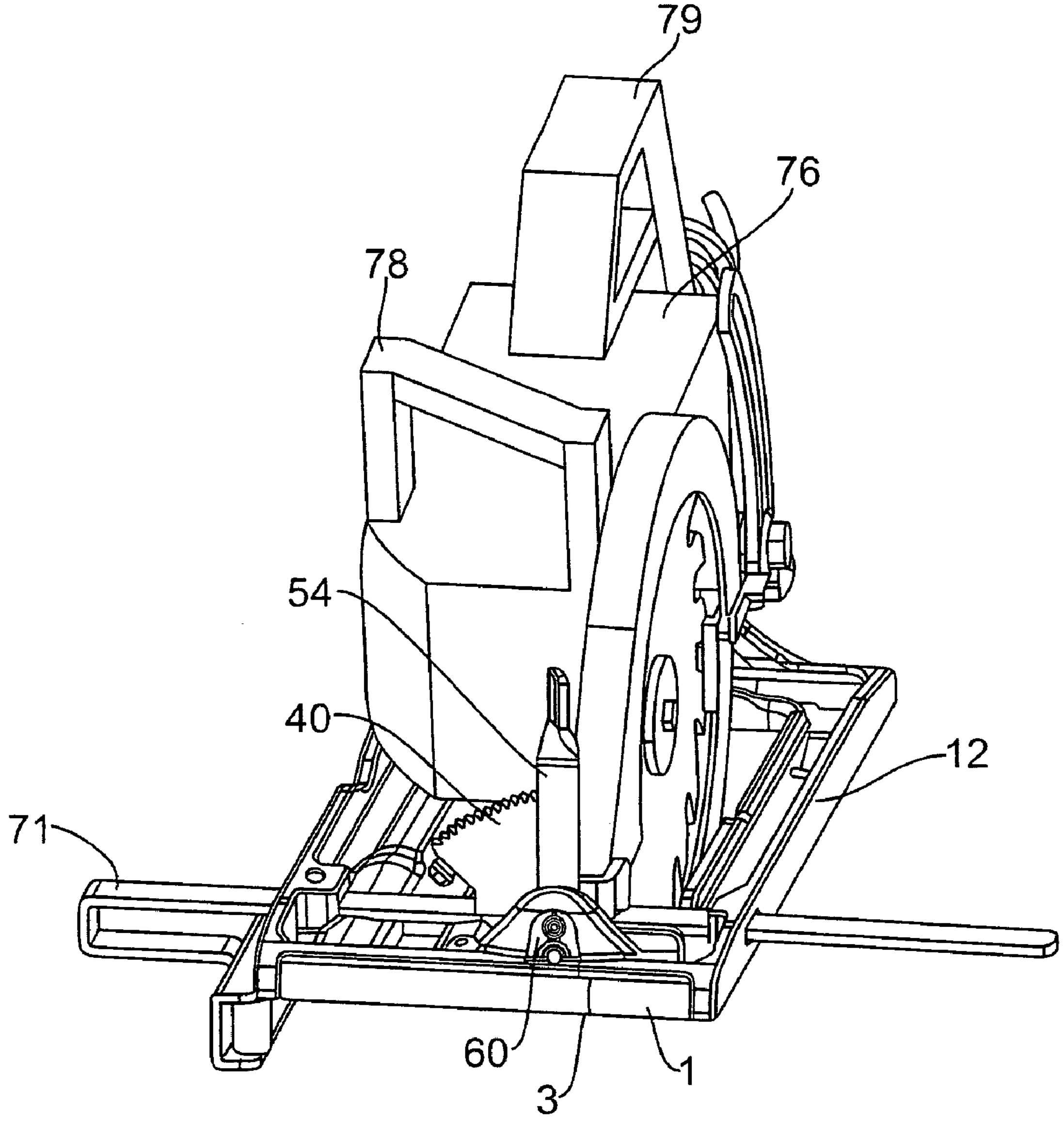
FIG. 24 is a perspective view of a circular power saw attached to the present invention rolling plate assembly with the cutting guide in place.

In addition to the above features, the present invention improved rolling plate assembly further comprises a cutting guide apparatus to assure a straight and even cut. Referring to FIGS. 1 and 2, cutting guide slots 30 and 30A are respectively formed into sidewalls 12 and 12A. A thumb screw insert 31 is formed to receive a tightening screw. FIG. 20 is a bottom perspective view of the present invention rolling plate assembly 100 illustrating the cutting guide. FIG. 21 is a front elevational view of the present invention rolling plate assembly 100 illustrating the cutting guide. FIG. 22 is a top plan view of the present invention rolling plate assembly 100 illustrating the cutting guide. FIG. 23 is a bottom plan view of the present invention rolling plate assembly 100 illustrating the cutting guide. FIG. 24 is a perspective view of a circular power saw attached to the present invention rolling plate assembly 100 with the cutting guide in place.

Referring to FIGS. 20 through 24, the cutting guide 71 is illustrated. The cutting guide 71 comprises a guide frame 81 connected to a transverse wheel housing unit 86 which has a longitudinal gap 88 retaining a pair of spaced apart wheels 72 and 72A. Each wheel 72 and 72A has a respective longitudinal opening which each respectively receive a rotating pin 73 and 73A. Each pin extends through parallel spaced apart openings in top wall 86A and bottom wall 86B of housing 86.

The cutting guide 71 is illustrated as installed in use in FIGS. 20 through 24. Cutting guide frame 81 is inserted through slots 30 and 30A and is tightened by cutting guide fix bolt 75. In operation the location of the cut to be made is determined and the cutting guide frame 81 fixed so that rotating wheels 72 and 72A abut against the vertical side of the piece to be cut so that as the saw blade is moved, it will be forced to move in a straight line as the wheels properly align the saw blade 77 during a cut.

Figure 27:
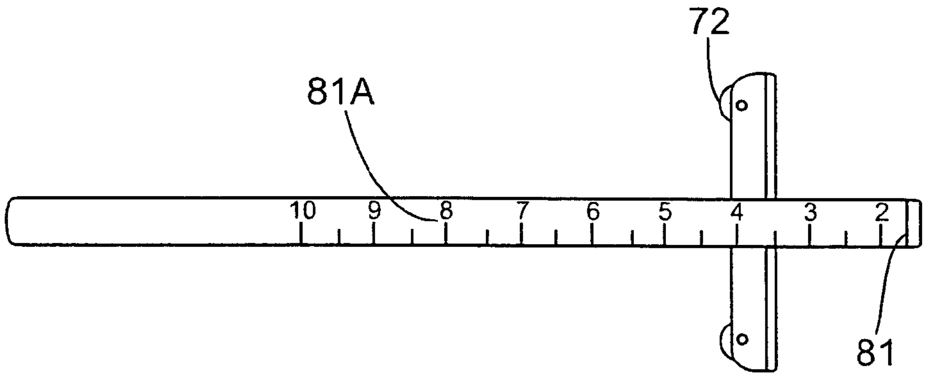
FIG. 27 is an illustration of measuring marks on the cutting guide frame of the cutting guide.
Figure 28:
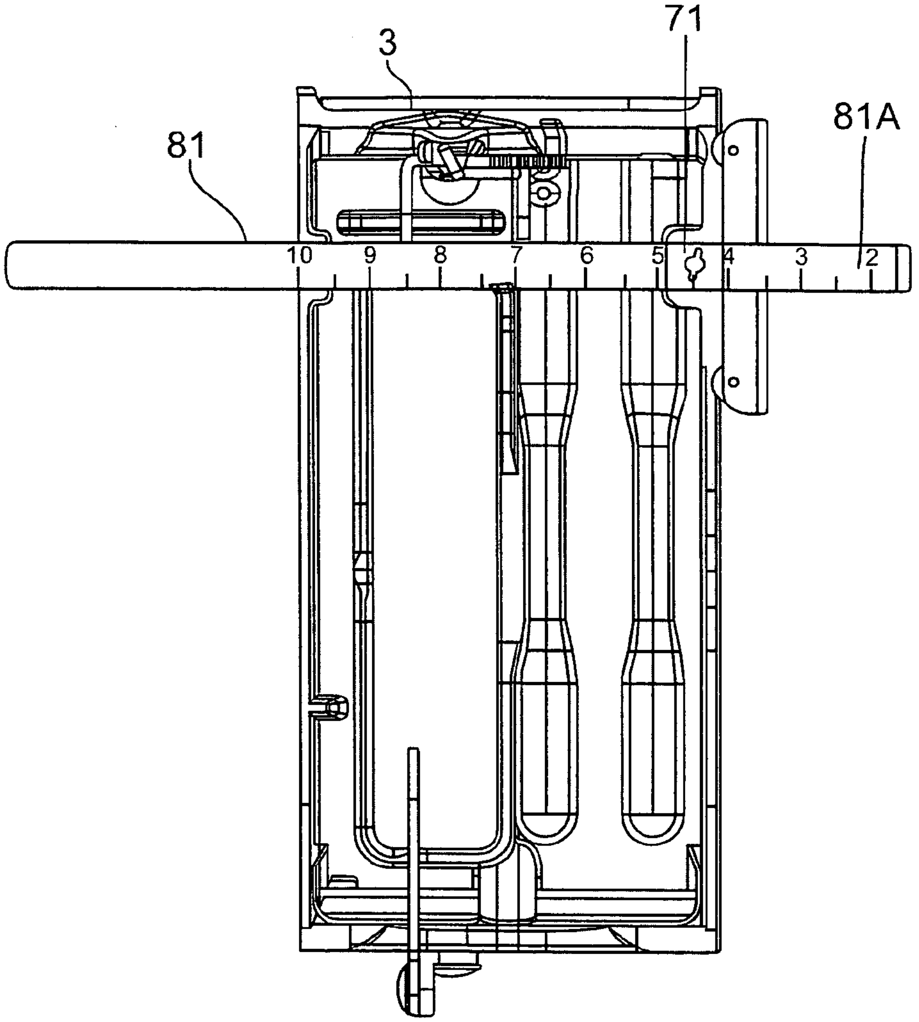
FIG. 28 is a top plan view of the rolling plate assembly with measuring marks on the cutting guide frame of the cutting guide.

As illustrated in FIGS. 27 and 28, a multiplicity of markings 81A such as inch denominations from 1 inch to 10 inches (or metric) can be placed on the cutting guide frame 81 to asist the carpenter in a forward cut on a workpiece.

Through the present invention, the improved rolling plate assembly 100 is one completed unit and is easily and quickly attached to the front and back of a rotary power saw. Its rectangular design provides stability to the power saw as it cuts through a workpiece. The improved rolling plate assembly 100 protects the work surface by elevating the assembly above the work surface by a portion of the diameter of the wheels 1 and 101 so that the rotary power saw 77 can easily roll on the work surface and will not scratch the work surface. This is especially important when the work surface is made of a fine finished surface such as veneer finished woods, marble, granite, etc. In addition to reducing kickback, the strong traction of the wheels helps to absorb the vibration generated by the rotary power saw and enables the user to make easy straight cuts.

The present invention improved rolling plate assembly 100 is a substantial improvement over the prior design in that it comprises a simple yet efficient frame structure to quickly and removably support a pair of rolling wheels 1 and 101 and mechanisms to quickly adjust the angle of orientation of the saw blade to any desired cut within an arc of 45 degrees. The mechanism further comprises a cutting guide to assure that all cuts will be straight. The smooth action of the wheels 1 and 101 combined with the steady movement assured by the cutting guide 71 significantly reduces kickback of the saw and substantially increases the speed, accuracy and safety of a cut. The innovation of fabricating the base assembly and its components out of fiber enriched plastic substantially reduces the weight of the device and the addition of stabilizer fins and stabilizer tubes substantially increases the torsional strength of the rolling plate assembly 100. One example of the fiber enriched plastic is fiber enriched polyurethane—Celstran TPU—GF 40 or Celstran TPU—GF 50 sold under the name ISOPLAST.

Referring to FIG. 25, a fourth significant improvement in the present invention is the incorporation of a metal bumper 400 molded into front wheel housing member 10. The metal bumper 400 is made of metal selected from the group consisting of steel, titanium, aluminum, and other durable metals. The metal bumper 400 is molded into the front wheel housing 10 to prevent the front wheel housing 10 from abrasion from contact with any surfaces such as the surface of a workpiece or if the rolling plate assembly 100 is dropped or hit against a surface. By way of example, the metal bumper can be in the range of 0.030" to 0.050" thick. In addition, a metal bumper 410 can be molded into the rear wheel housing 10A. The metal bumper 410 is made of metal selected from the group consisting of steel, titanium, aluminum and other durable metal. The metal bumper 410 is molded into the rear wheel housing 10A to prevent the rear wheel housing 10A from abrasion from contact with any surfaces such as the surface of a workpiece or if the rolling plate assembly is dropped or hit against a surface. By way of example, the metal bumper 410 can be in the range of 0.030" to 0.050" thick.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which the invention might be, embodied or operated.

What is claimed is:

1. A rolling plate assembly for attachment to a portable rotary power saw have having a saw blade, comprising:

a. a one piece base molded out of a single piece of fiber enriched plastic having a front housing member with a leading edge having a metal plate molded into the leading edge and a rear housing member with a rear edge, the two housing members interconnected by a first longitudinal sidewall having a raised stabilizer fin, a parallel oppositely disposed second longitudinal sidewall having a raised stabilizer fin, a horizontal flat plate section extending between the front housing member and the rear housing member, at least one stabilize tube formed into the horizontal flat plate section, and a saw blade penetration slot extending through the horizontal flat plate section;

b. each housing member having a pair of oppositely disposed wheel bearing seats, the front housing member rotatably supporting a front wheel having a multiplicity of measurement denominations thereon and having an interior wheel shaft terminating in a pair of wheel bearings at either end, the front wheel rotatably and removably supported in the front housing by insertion of the wheel bearings in into a front housing bearing seat, the front wheel having a given diameter, a diameter of an entrance to the front housing bearing seat being smaller than the diameter of the front wheel and expanding to an interior chamber having at least the same diameter as the front wheel, the rear housing member rotatably supporting a rear wheel having an interior wheel shaft terminating in a pair of wheel bearings at either end, the rear wheel rotatably and removably supported in the rear wheel housing by insertion of the wheel bearing into a rear housing bearing seat, the rear wheel having a given diameter, a diameter of an entrance to the rear housing bearing seat being smaller than the diameter of the rear wheel and expanding to an interior chamber having at least the same diameter of the rear wheel;

c. a gear housing attached to said front housing, a flexible adjustment member retained at one end to the gear housing, a bevel adjustment lever retained at the opposite end of the flexible adjustment member, the bevel adjustment lever having a handle at one end and a multiplicity of teeth along its opposite end, a calibrated bevel bracket rotatably attached at one end to the flexible adjustment member and having a multiplicity of teeth along its opposite end which intermeshes with the teeth of the bevel adjustment lever, the calibrated bevel bracket having saw retaining means extending transversely therefrom;

d. a tilt bracket housing formed on said rear housing and rotatably supporting an arcuate plunge bracket having an interior arcuate slot;

e. said first and second longitudinal sidewalls each having a cutting guide housing thereon, a cutting guide having a frame member having a multiplicity of marking denominations thereon supporting a wheel housing at one end, the wheel housing rotatably retaining a pair of spaced apart wheels, a portion of the cutting guide frame member remote from the wheel housing retained in the cutting guide housings and affixed to at least one cutting guide housing so that the wheels extend in a plane perpendicular to the one piece frame;

f. a power saw retained adjacent one end by fastening means connected to the saw retaining means of the calibrated bevel bracket and retained adjacent the saw's opposite end by fastening means connected through the arcuate slot of the arcuate plunge bracket, the saw blade extending through the penetration slot; and g. the wheels rotatably supported in the first and second housing of the one piece frame enable the saw to be rolled on a surface of an object to be cut by the saw blade during a cutting operation, the angle of the saw blade being rapidly changed by moving the bevel adjustment lever so that teeth of the bevel adjustment lever and calibrated bevel bracket are disengaged and rotating the calibrated bevel bracket to a desired angle and releasing the bevel adjustment lever so that the teeth are again intermeshed, the wheels of the cutting guide pressed against a vertical surface of the object to be cut so that the saw will create a straight cut and kickback of the saw and torsional rotation of the saw is reduced.

2. A rolling plate assembly for attachment to a tool, comprising:

a. a one piece base molded out of a single piece of fiber enriched plastic having a front housing member with a metal plate molded into the leading edge and a rear housing member, the two housing members interconnected by a first longitudinal sidewall having a raised stabilizer fin, a parallel oppositely disposed, second longitudinal sidewall having a raised stabilizer fin, a horizontal flat plate section extending between the front housing member and the rear housing member, at least one stabilizer tube formed into the horizontal flat plate section, and a penetration slot extending through the horizontal flat plate section;

b. each housing member having a pair of oppositely disposed wheel bearing seats, the front housing member rotatably supporting a front wheel having an interior wheel shaft terminating in a pair of wheel bearings at either end, the front wheel rotatably and removably supported in a front wheel bearing housing by insertion of the wheel bearings in into a front bearing housing seat, the rear housing member rotatably supporting a rear wheel having an interior wheel shaft terminating in a pair of wheel bearings at either end, the rear wheel rotatably and removably supported in the rear wheel housing by insertion of the wheel bearings into a rear housing bearing seat, the front wheel having a given diameter, a diameter of an entrance to the front bearing housing seat being smaller than the diameter of the front wheel and expanding to an interior chamber having at least the same diameter as the front wheel, the rear wheel having a given diameter, a diameter of an entrance to the rear housing bearing seat being smaller than the diameter of the rear wheel and expanding to an interior chamber having at least the same diameter of the rear wheel;

c. a gear housing attached to said front housing, a flexible adjustment member retained at one end to the gear housing, a bevel adjustment lever retained at the opposite end of the flexible adjustment member, the bevel adjustment lever having a handle at one end and a multiplicity of teeth along its opposite end, a calibrated bevel bracket rotatably attached at one end to the flexible adjustment member and having a multiplicity of teeth along its opposite end which intermeshes with the teeth of the bevel adjustment lever, the calibrated bevel bracket having tool retaining means extending transversely therefrom;

d. a tilt bracket housing formed on said rear housing and rotatably supporting an arcuate plunge bracket having an interior arcuate slot;

e. said first and second longitudinal sidewalls each having a cutting guide housing thereon, a cutting guide having a frame member supporting a wheel housing at one end, the wheel housing rotatably retaining at least one wheel, a portion of the cutting guide frame member remote from the wheel housing retained in the cutting guide housings and affixed to at least one cutting guide housing so that the at least one wheel extend sn a plane perpendicular to the one piece frame;

f. a tool retained adjacent one end by fastening means connected to the tool retaining means of the calibrated bevel bracket and retained adjacent the tool's opposite end by fastening means connected through the arcuate slot of the arcuate plunge bracket, a portion of the tool extending through the penetration slot; and g. the wheels rotatably supported in the first and second housing of the one piece frame enable the tool to be rolled on a surface of an object to be modified by the tool, the angle of the tool being rapidly changed by moving the bevel adjustment lever so that teeth of the spring lever and calibrated bevel bracket are disengaged and rotating the calibrated bevel bracket to a desired angle and releasing the spring lever so that the teeth are again intermeshed, the at least one wheel of the cutting guide pressed against a vertical surface of the object to be modified so that the tool will move in the straight line.

3. The rolling plate assembly in accordance with claim 2 further comprising the front wheel having a multiplicity of measurement denominations thereon.

4. The rolling plate assembly in accordance with claim 2 further comprising the cutting guide frame having a multiplicity of measurement denominations thereon.

5. A rolling plate assembly for attachment to a tool, comprising:

a. a one piece base molded out of a single piece of material having a front housing member and a rear housing member, the two housing members interconnected by a first longitudinal sidewall having a raised stabilizer fin, a parallel oppositely disposed second longitudinal sidewall having a raised stabilizer fin, a horizontal flat plate section extending between the front housing member and the rear housing member, at least one stabilizer tube formed into the horizontal flat plate section, and a penetration slot extending through the horizontal flat plate section;

b. each housing member having a pair of oppositely disposed wheel bearing seats, the front housing member rotatably supporting a front wheel having an interior wheel shaft terminating in a pair of wheel bearings at either end, the front wheel rotatably and removably supported in the front housing by insertion of the wheel bearings in into a front housing bearing seat, the front wheel having a given diameter, a diameter of an entrance to the front housing bearing seat being smaller than the diameter of the front wheel and expanding to an interior chamber having at least the same diameter as the front wheel, the rear housing member rotatably supporting a rear wheel having an interior wheel shaft terminating in a pair of wheel bearings at either end, the rear wheel rotatably and removably supported in the rear wheel housing by insertion of the wheel bearing into a rear housing bearing seat, the rear wheel having a given diameter, a diameter of an entrance to the rear housing bearing seat being smaller than the diameter of the rear wheel and expanding to an interior chamber having at least the same diameter of the rear wheel;

c. a tool retained on the frame by a retaining means, a portion of the tool extending through the penetration slot; and d. the wheels rotatably supported in the front and rear housing members of the frame enable the tool to be rolled on a surface of an object to be altered by the tool, the positioning of the wheels within the housings enable the tool to move in a straight line and kickback of the tool and torsional rotation of the tool is reduced.

6. A rolling plate assembly in accordance with claim 5 further comprising a metal plate molded into an exterior surface of the front wheel housing.

7. A rolling plate assembly in accordance with claim 5 further comprising:

a. a first transverse slot extending through the first longitudinal sidewall, a second longitudinal slot extending through the second longitudinal sidewall, the two slots parallel to and aligned with each other;

b. a thumb screw insert located adjacent the second longitudinal sidewall and above the horizontal plate, a tightening screw extending through the thumb screw insert;

c. a cutting guide including a cutting guide frame connected to a transverse wheel housing unit which has a longitudinal gap retaining a pair of spaced apart guide wheels, each guide wheel of the cutting guide having a respective longitudinal opening respectively receiving a rotating pin, each respective rotating pin extending through parallel spaced apart openings in a top wall and a bottom wall of the transverse wheel housing unit.

8. The rolling plate assembly in accordance with claim 7 further comprising the cutting guide frame having a multiplicity of measurement denominations thereon.

9. A rolling plate assembly in accordance with claim 5 further comprising:

a. a first transverse slot extending through the first longitudinal sidewall, a second longitudinal slot extending through the second longitudinal sidewall, the two slots parallel to and aligned with each other;

b. a cutting guide including a guide frame connected to a transverse wheel housing unit which has a longitudinal gap retaining a pair of spaced apart guide wheels, each guide wheel rotatably supported within the longitudinal gap of the transverse wheel housing unit; and c a cutting tool retained on the rolling plate assembly so that its blade extends through the blade penetration slot, the wheels of the base of the rolling plate assembly placed on a work surface of a workpiece, the cutting guide frame inserted through the first and second transverse slots and retained in a desired location by a tightening member extending through said base which requires the two guide wheels to rest against a transverse surface of a workpiece so that a cut from a blade of a cutting tool into a work surface of a workpiece will be made in a straight line.

10. The rolling plate assembly in accordance with claim 9 further comprising the cutting guide frame having a multiplicity of measurement denominations thereon.

11. A rolling late assembly in accordance with claim 5 further comprising:

a. at least one connecting member having a cutting guide housing thereon, a cutting guide having a frame member supporting a wheel housing at one end, the wheel housing rotatably retaining at least one wheel, a portion of the cutting guide frame member extending through the cutting guide retaining members of the two longitudinal sidewalls and affixed to the rolling plate assembly so that the at least one wheel extends in a plane perpendicular to the connecting member; and b. a cutting tool retained on the rolling plate assembly so that its cutting blade extends through the blade penetration slot, the wheels of the base of the rolling plate assembly placed on a work surface of the object to be altered, the cutting guide retained in a desired location on the rolling plate assembly which requires the at least one guide wheel to rest against a transverse surface of an object to be altered so that a cut from a blade of a cutting tool into a work surface of an object to be altered will be made in a straight line.

12. The rolling plate assembly in accordance with claim 11 further comprising the cutting guide frame having a multiplicity of measurement denominations thereon.

13. The rolling plate assembly in accordance with claim 5 further comprising the front wheel having a multiplicity of measurement denominations thereon.

* * * * *